(12) United States Patent
Li et al.

(10) Patent No.: US 10,924,759 B2
(45) Date of Patent: Feb. 16, 2021

(54) HISTORY-BASED AFFINE MERGE AND MOTION VECTOR PREDICTION

(71) Applicant: TENCENT AMERICA LLC, Palo Alto, CA (US)

(72) Inventors: Guichun Li, Milpitas, CA (US); Xiaozhong Xu, State College, PA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/232,579

(22) Filed: Dec. 26, 2018

(65) Prior Publication Data

US 2020/0036997 A1 Jan. 30, 2020

Related U.S. Application Data

(60) Provisional application No. 62/711,397, filed on Jul. 27, 2018.

(51) Int. Cl.
*H04N 19/513* (2014.01)
*H04N 19/174* (2014.01)
*H04N 19/127* (2014.01)
*H04N 19/139* (2014.01)
*H04N 19/176* (2014.01)
(Continued)

(52) U.S. Cl.
CPC ......... *H04N 19/521* (2014.11); *H04N 19/127* (2014.11); *H04N 19/139* (2014.11); *H04N 19/174* (2014.11); *H04N 19/176* (2014.11); *H04N 19/423* (2014.11);
(Continued)

(58) Field of Classification Search
None
See application file for complete search history.

(56) References Cited

U.S. PATENT DOCUMENTS 6,131,151 A * 10/2000 Graef ............... H04N 19/61
375/E7.094
8,526,495 B2 9/2013 Liu et al.
(Continued)

OTHER PUBLICATIONS

Huang et al., "Control-Point Representation and Differential Coding Affine-Motion Compensation", IEEE Transactions on Circuits and Systems for Video Technology, vol. 23, No. 10, Oct. 2013.*
High Efficiency Video Coding (HEVC), Rec. ITU-T H.265 v4, Dec. 2016.
B. Bross, J. Chen, S. Liu, "Versatile Video Coding (Draft 2)", ISO/IEC JTC1/SC29/WG11 JVET-K1001, Jul. 2018.
"A dynamic motion vector referencing scheme for video coding", Jingning Han, Yaowu Xu, and James Bankoski, Sep. 2016, ICIP.
(Continued)

*Primary Examiner* — Edemio Navas, Jr.
(74) *Attorney, Agent, or Firm* — Oblon, McClelland, Maier & Neustadt, L.L.P.

(57) ABSTRACT

A method for video coding includes encoding or decoding a coding block in a current picture with an affine motion model based inter-picture prediction method in a video coding system, storing affine motion information of the coding block in a history-based motion vector prediction (HMVP) buffer that is configured for storing affine motion information candidates each including affine motion information of a processed affine-coded coding block, and constructing a motion candidate list for a current block that includes at least one candidate selected from the affine motion information candidates stored in the HMVP buffer or derived from one of the affine motion information candidates stored in the HMVP buffer.

18 Claims, 16 Drawing Sheets

(51) Int. Cl.
*H04N 19/436* (2014.01)
*H04N 19/423* (2014.01)
*H04N 19/577* (2014.01)
*H04N 19/58* (2014.01)

(52) U.S. Cl.
CPC ......... *H04N 19/436* (2014.11); *H04N 19/577* (2014.11); *H04N 19/58* (2014.11)

(56) References Cited

U.S. PATENT DOCUMENTS

| | | | | |
|---|---|---|---|---|
| 8,774,544 | B1* | 7/2014 | Szedo | G06K 9/40 382/260 |
| 9,049,452 | B2 | 6/2015 | Liu et al. | |
| 9,510,012 | B2 | 11/2016 | Liu et al. | |
| 9,813,726 | B2 | 11/2017 | Liu et al. | |
| 2007/0063998 | A1* | 3/2007 | Mahesh | G06F 3/0482 345/419 |
| 2009/0323813 | A1* | 12/2009 | Maciel de Faria | H04N 19/56 375/240.16 |
| 2012/0147017 | A1* | 6/2012 | Hong | H04N 19/439 345/506 |
| 2014/0286429 | A1* | 9/2014 | Arakage | H04N 19/52 375/240.16 |
| 2018/0192069 | A1* | 7/2018 | Chen | H04N 19/52 |

OTHER PUBLICATIONS

J. Ye, X. Li, S. Liu, "Merge mode modification on top of Tencent's software in response to CfP", JVET-J0058, Apr. 2018, San Diego, USA.

L.Zhang, K.Zhang, H. Liu, Y. Wang, P. Zhao, D. Hong, "CE4-related: History-based Motion Vector Prediction", JVET-K0104, Jul. 2018, Ljubljana, SI.

H. Yang, et al, "Description of Core Experiment 4 (CE4): Inter prediction and motion vector coding", ISO/IEC JTC1/SC29/WG11 JVET-J1024, 2018.

Xu, et al, "CE2: Test 3.2—Intra BC merge mode with default candidates", ISO/IEC JTC1/SC29/WG11 JCTVC-T0073, 2015.

H. Huang, J. Woods, Y. Zhao and H. Bai, "Control-Point Representation and Differential Coding Affine-Motion Compensation", IEEE Transactions on Circuits and Systems for Video Technology, vol. 23, Issue: 10, pp. 1651-1660, Oct. 2013.

Li Li, Houqiang Li, Zhuoyi Lv, Haitao Yang, "An affine motion compensation framework for high efficiency video coding", 2015 IEEE International Symposium on Circuits and Systems (ISCAS), May 2015.

S. Lin, H. Chen, H. Zhang, S. Maxim, H. Yang, J. Zhou, "Affine transform prediction for next generation video coding", ITU-T SG16 Doc. COM16-C1016, Oct. 2015.

Y. Wang, et al, "CE4.2.12 Affine merge mode", JVET-K0355, 2018.

* cited by examiner

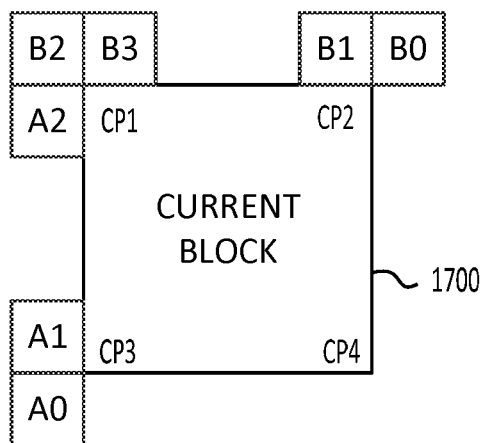
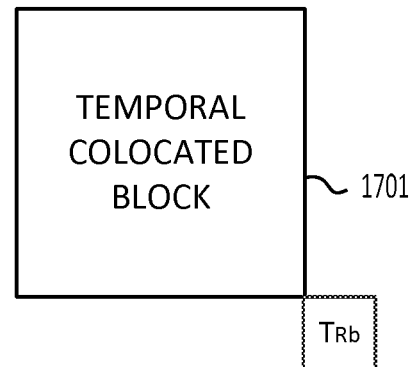
FIG. 17A  FIG. 17B
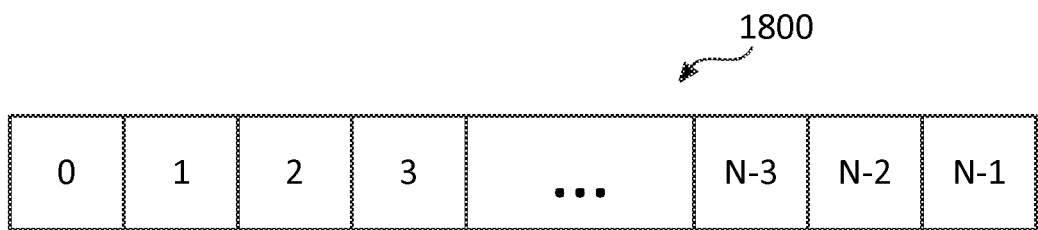
FIG. 18

HISTORY-BASED AFFINE MERGE AND MOTION VECTOR PREDICTION

INCORPORATION BY REFERENCE

This present disclosure claims the benefit of priority to U.S. Provisional Application No. 62/711,397, "History-Based Affine Merge and Motion Vector Prediction" filed on Jul. 27, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 gigabytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provided a method for video coding. The method can include encoding or decoding a coding block in a current picture with an affine motion model based inter-picture prediction method in a video coding system, storing affine motion information of the coding block in a history-based motion vector prediction (HMVP) buffer that is configured for storing affine motion information candidates each including affine motion information of a processed affine-coded coding block, and constructing a motion candidate list for a current block that includes at least one candidate selected from the affine motion information candidates stored in the HMVP buffer or derived from one of the affine motion information candidates stored in the HMVP buffer.

In an embodiment, the motion candidate list for the current block is one of a merge candidate list for coding motion information of the current block with a merge mode, and a motion information predictor candidate list for differential coding of motion information of the current block. In an embodiment, the affine motion information of the coding block includes motion information of each control point of the coding block that defines an affine motion model.

An embodiment of the method can further include storing position information of the coding block and information of at least one of a width and a height of the coding block in the HMVP buffer. In an embodiment, the affine motion information of the coding block includes affine motion parameters of the coding block that defines an affine motion model. An embodiment of the method can further include performing a pruning process before storing the affine motion information of the coding block in the HMVP buffer in which similarity of the affine motion information of the coding block to the affine motion information candidates in the affine HMVP buffer is examined.

In an embodiment, the motion candidate list includes affine motion candidates that are derived based on at least one of a model based affine motion information prediction method and a control point based affine motion information prediction method. In an embodiment, the HMVP buffer is a first-in-first-out (FIFO) buffer.

In an embodiment, the method can further include resetting the HMVP buffer when one or a combination of the following conditions are satisfied: the coding block is the beginning of a coding tree unit (CTU); the coding block is the beginning of a tile; the coding block is the beginning of a CTU row with wave front parallel processing enabled; the coding block is the beginning of a CTU row without wave front parallel processing enabled; and the coding block is the beginning of a slice.

In an embodiment, the method further includes deriving motion information of control points of the current block based on control point motion information, position information, width and height information of a processed affine-coded coding block in one of the at least one affine motion candidate in the motion candidate list.

In an embodiment, the step of constructing the motion candidate list for the current block includes deriving motion information of control points of the current block based on control point motion information, position information, width and height information of a processed affine-coded coding block in one of the affine motion information candidates stored in the HMVP buffer, and adding the derived motion information of the control points of the current block to the motion candidate list for the current block.

In an embodiment, the motion candidate list further includes one or more of affine motion candidates derived from at least one of a spatial neighboring block and a temporal neighboring block of the current block. In an embodiment, the motion candidate list further includes one or more of non-affine motion candidates.

In an embodiment, the motion candidate list further includes one or more of affine motion candidates that are derived based on at least one of a model based affine motion information prediction method and a control point based affine motion information prediction method. In an embodiment, the motion candidate list further include one or more of sub-block based non-affine motion candidates. In an example, the sub-block based non-affine motion candidates includes a sub-block based temporal motion vector prediction (TMVP) motion candidate.

In an embodiment, the motion candidate list includes one or more of affine motion candidates that are derived based on a control point based affine motion information prediction method, and one or more of sub-block based non-affine motion candidates.

Aspects of the disclosure further provide an apparatus for video coding. The apparatus includes a history-based motion vector prediction (HMVP) buffer that is configured to store affine motion information candidates each including affine motion information of a processed affine-coded coding block. The apparatus further includes circuitry configured to encode or decode a coding block in a current picture with an affine motion model based inter-picture prediction method, store affine motion information of the coding block in the HMVP buffer, and construct a motion candidate list for a current block that includes at least one candidate selected from the affine motion information candidates stored in the HMVP buffer or derived from one of the affine motion information candidates stored in the HMVP buffer.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which:

FIGS. 17A-17B show an example of spatial and temporal candidate positions for affine merge candidate list construction in a control points based affine merge mode.

FIG. 18 shows an example of an affine history-based motion vector prediction (HMVP) buffer according to an embodiment of the disclosure.

DETAILED DESCRIPTION OF EMBODIMENTS

Figure 1:
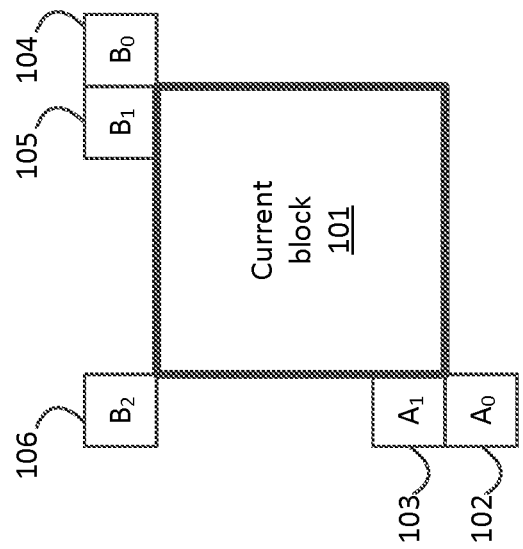
FIG. 1 is a schematic illustration of a current block and its surrounding spatial merge candidates in one example.
Figure 2:
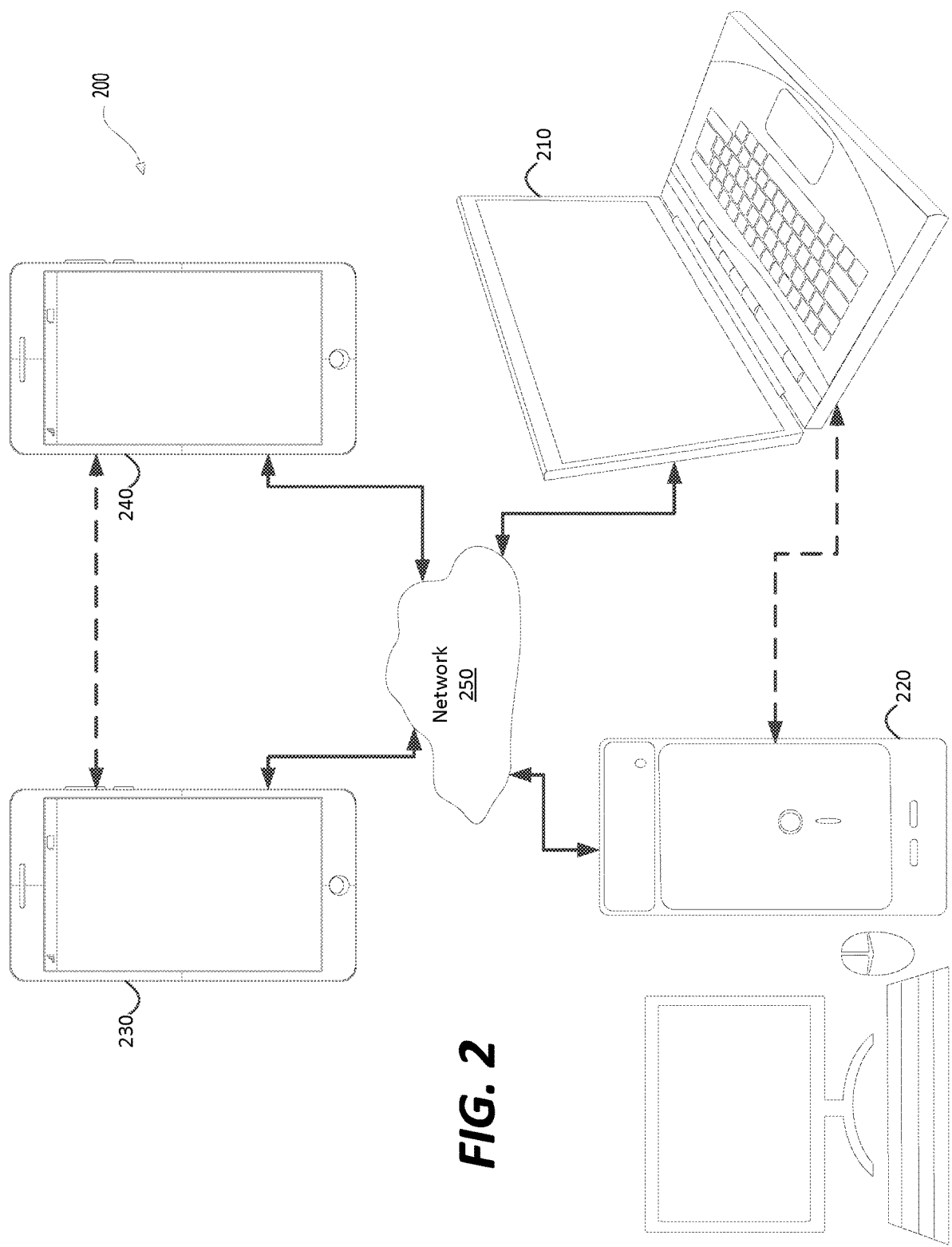
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
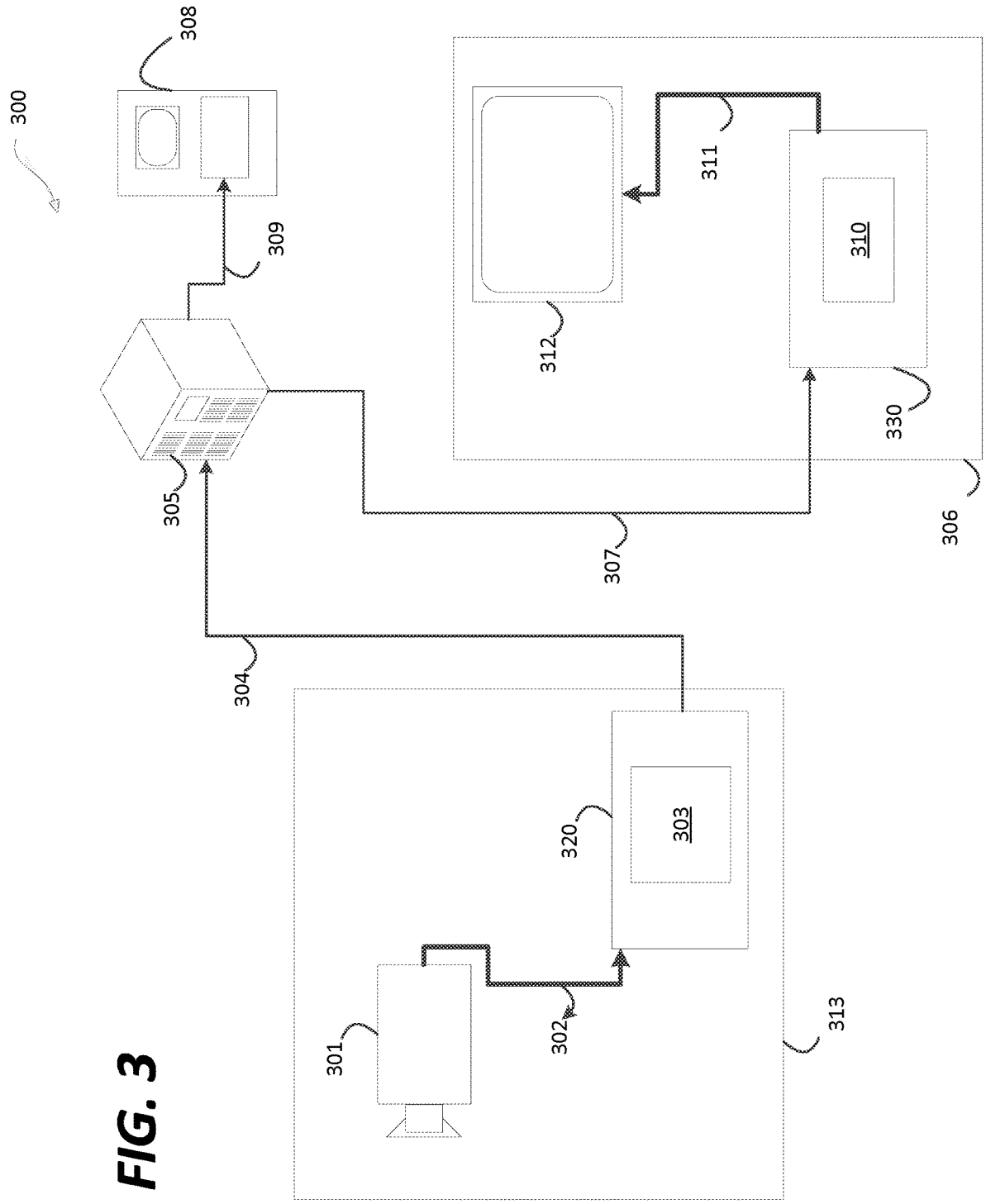
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
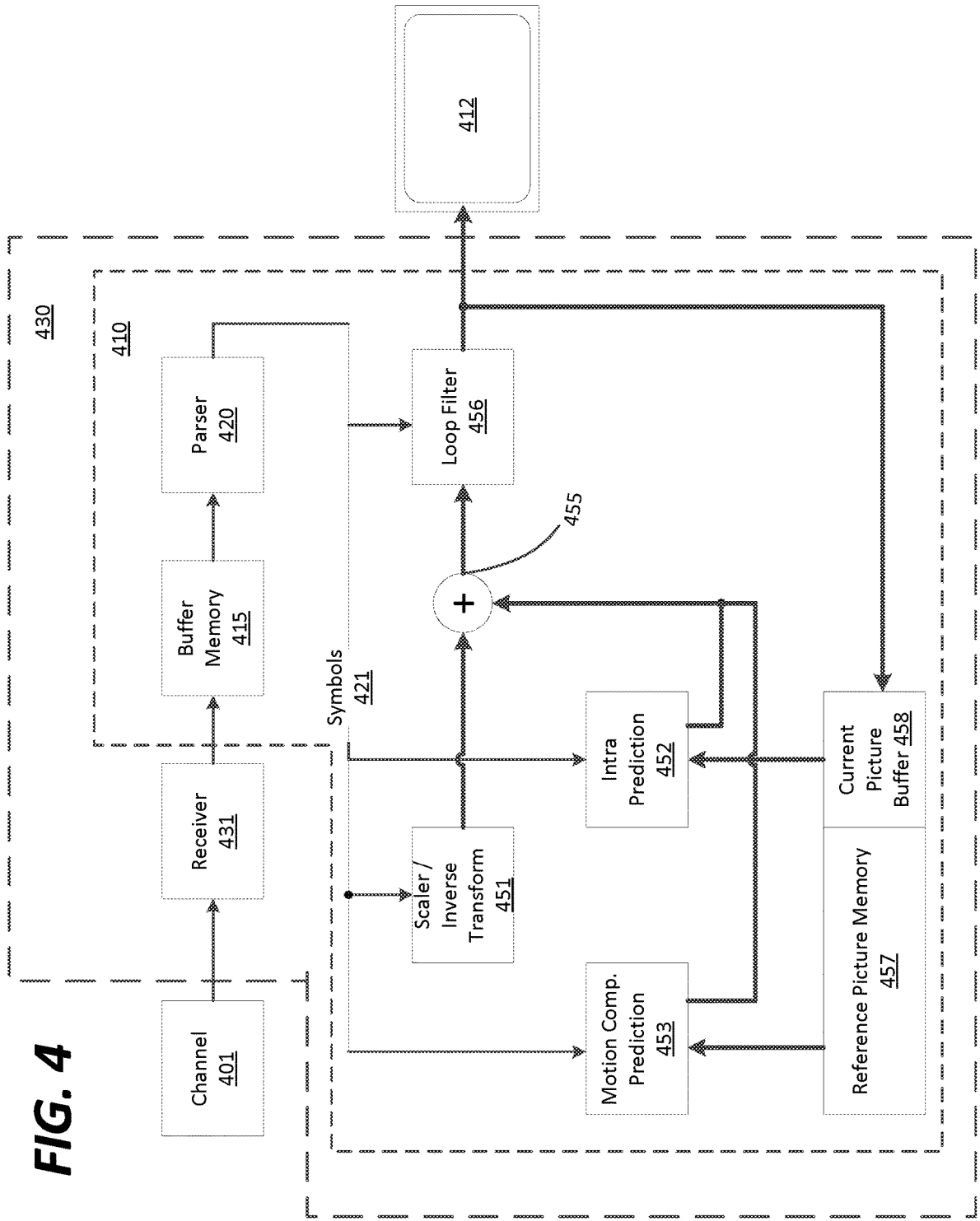
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
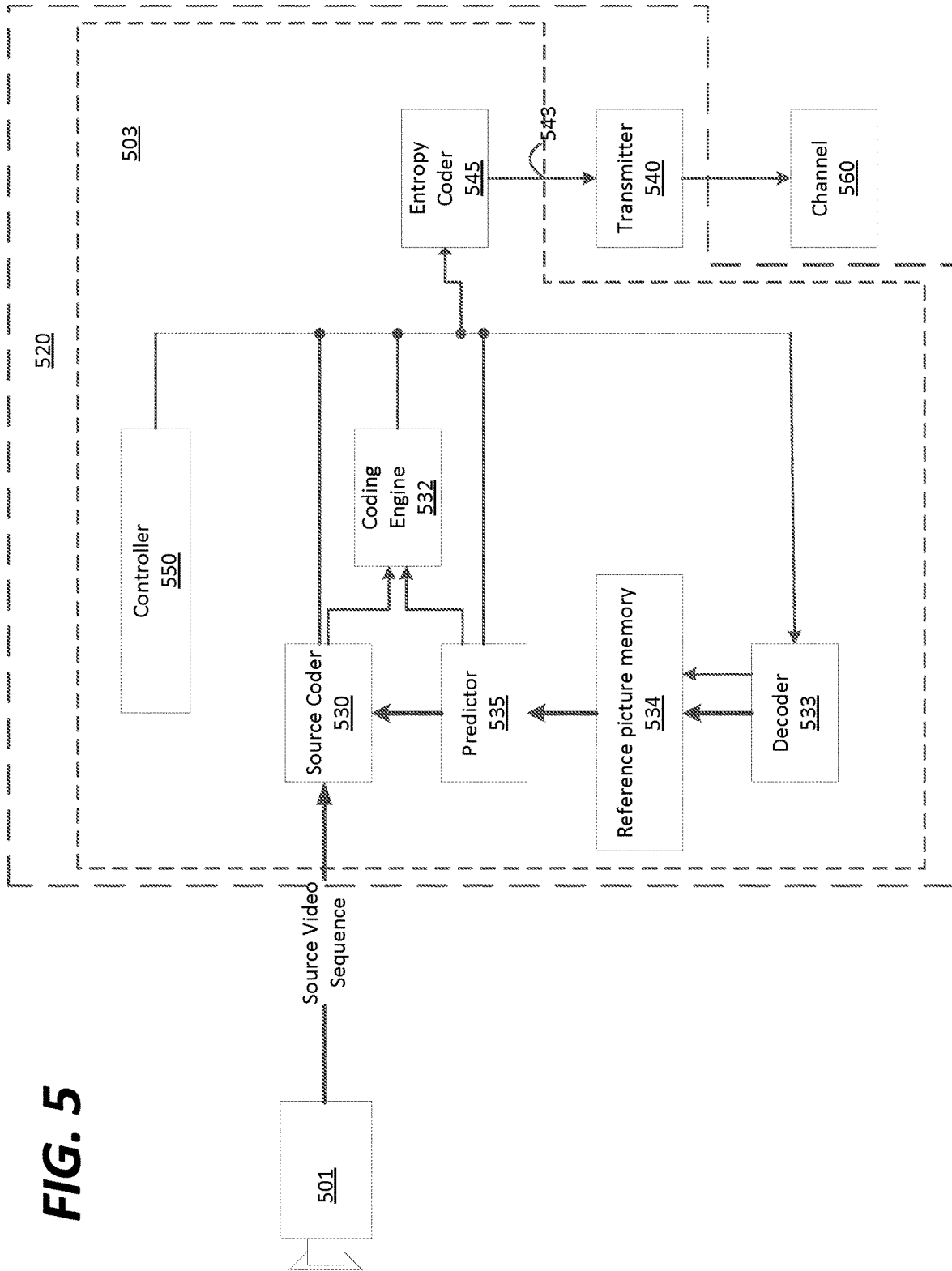
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
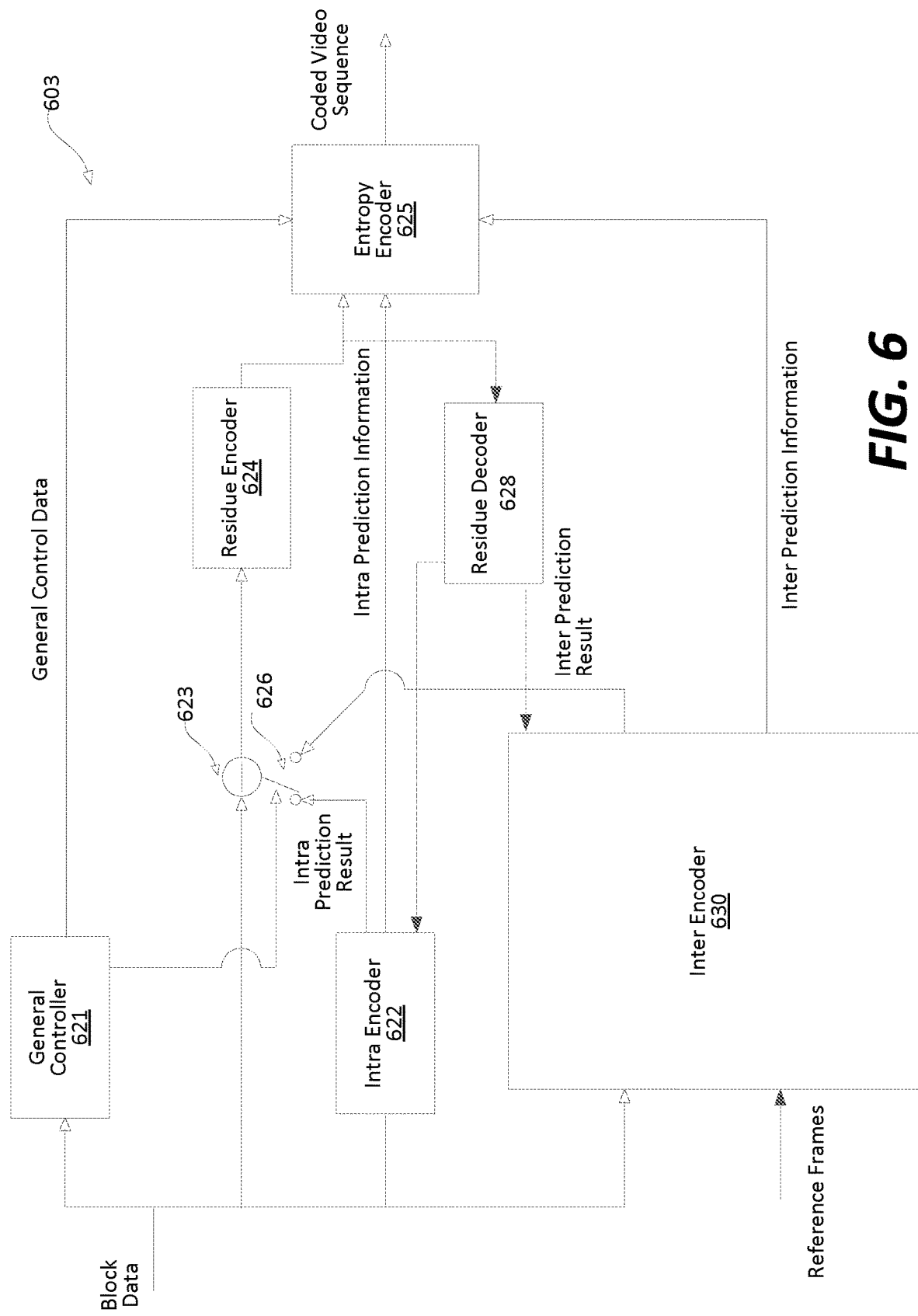
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a time domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
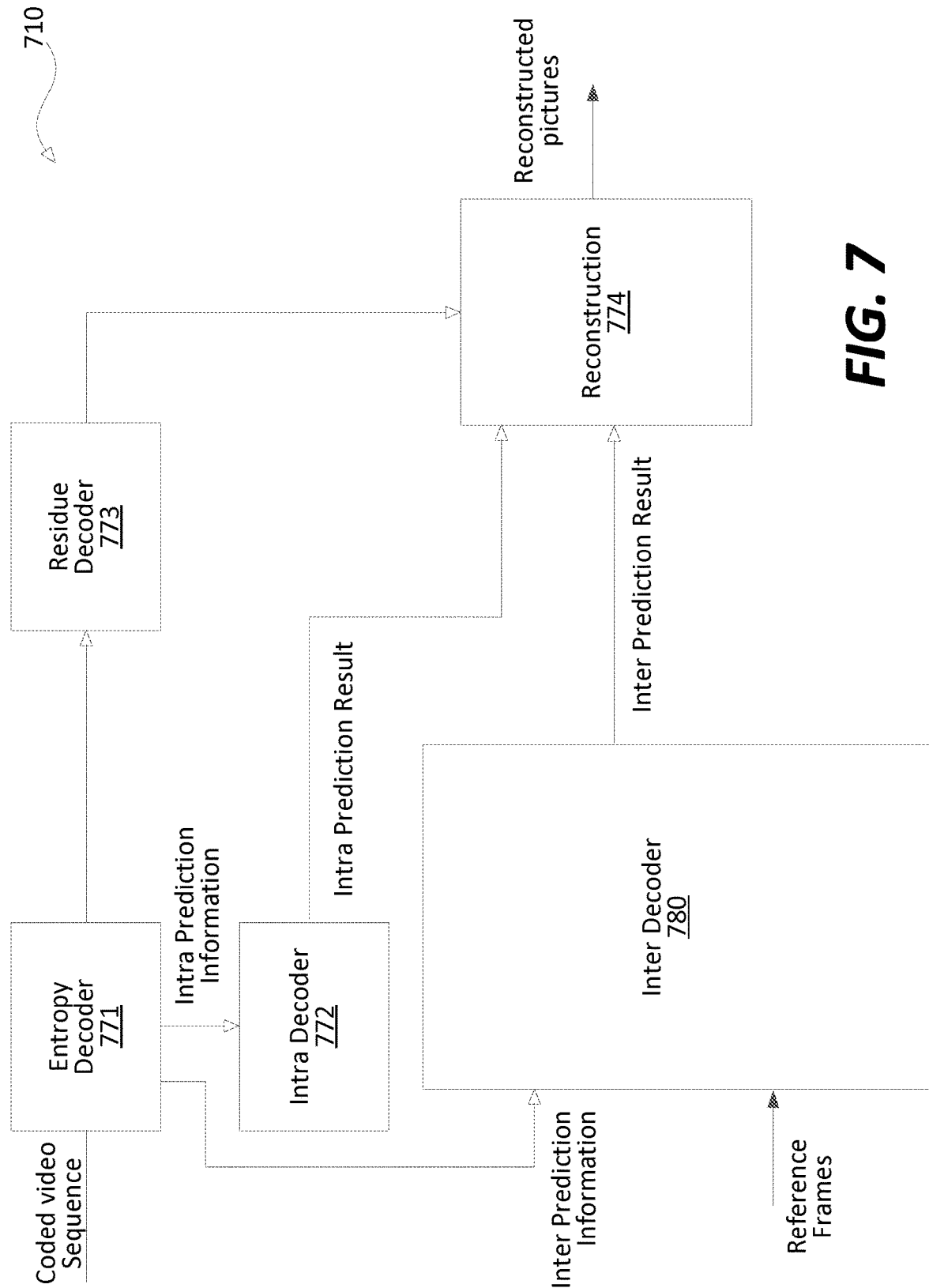
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

I. Related Motion Information Coding Technologies
I. 1 Merge Mode in HEVC

A picture can be partitioned into blocks, for example, using a tree structure based partition scheme. The resulting blocks can then be processed with different processing modes, such as intra prediction mode, inter prediction mode, merge mode, skip mode, and the like. When a currently processed block, referred to as a current block, is processed with a merge mode, a neighbor block can be selected from a spatial or temporal neighborhood of the current block. The current block can be merged with the selected neighbor block by sharing a same set of motion data from the selected neighbor block. This merge mode operation can be performed over a group of neighbor blocks, such that a region of neighbor blocks can be merged together and share a same set of motion data. During transmission from an encoder to a decoder, only an index indicating the motion data of the selected neighbor block can be transmitted for the current block, instead of transmission of a whole set of motion data. In this way, an amount of data (bits) that are used for transmission of motion information can be reduced, and coding efficiency can be improved.

In the above example, the neighbor block, which provides the motion data, can be selected from a set of candidate positions predefined with respect to the current block. For example, the candidate positions can include spatial candidate positions and temporal candidate positions. Each spatial candidate position is associated with a spatial neighbor block neighboring the current block. Each temporal candidate position is associated with a temporal neighbor block located in a previously coded picture. Neighbor blocks overlapping the candidate positions (referred to as candidate blocks) are a subset of spatial neighbor blocks of the current block and temporal neighbor blocks of the current block. In this way, the candidate blocks can be evaluated for selection of a to-be-merged block instead of the whole set of neighbor blocks.

Figure 8:
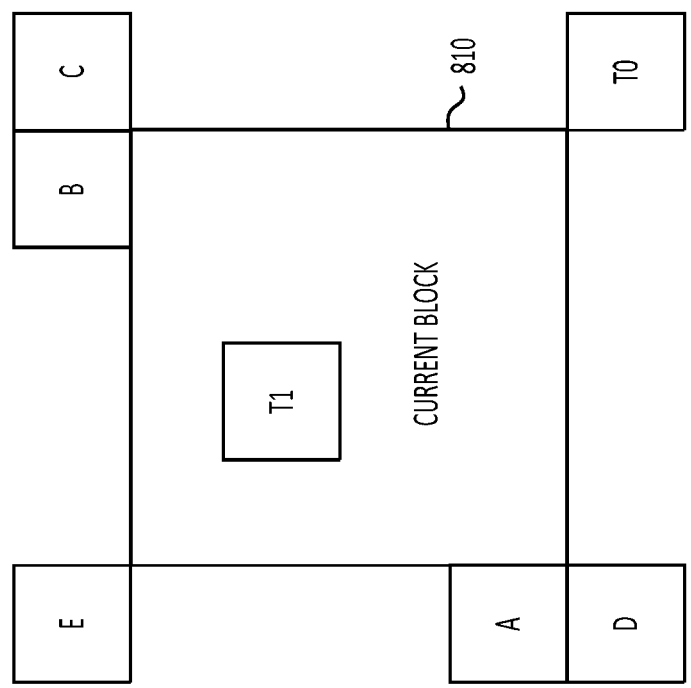
FIG. 8 shows exemplary merge mode candidate positions.

FIG. 8 shows exemplary merge mode candidate positions, for example as defined in HEVC. A current block (810) is to be processed with merge mode. A set of candidate positions {A, B, C, D, E, T0, T1} are defined for the merge mode processing. Specifically, candidate positions {A, B, C, D, E} are spatial candidate positions that represent positions of candidate blocks that are in the same picture as the current block (810). In contrast, candidate positions {T0, T1} are temporal candidate positions that represent positions of candidate blocks that are in a previously coded picture. As shown, the candidate position T1 can be located near a center of the current block (810).

In FIG. 8, each candidate position is represented by a block of samples, for example, having a size of 4×4 samples. A size of such a block corresponding to a candidate position can be equal to or smaller than a minimum allowable size of prediction blocks (PBs) (e.g., 4×4 samples) defined for a tree-based partitioning scheme used for generating the current block (810). Under such a configuration, a block corresponding to a candidate position can always be covered within a single neighbor PB. In an alternative example, a sample position (e.g., a bottom-right sample within the block A, or a top-right sample within the block D) may be used to represent a candidate position.

In one example, based on the candidate positions {A, B, C, D, E, T0, T1} defined in FIG. 8, a merge mode process can be performed to select merge candidates from the candidate positions {A, B, C, D, E, T0, T1}. In the merge mode process, a candidate list construction process can be performed to construct a candidate list. The candidate list can have a predefined maximum number of merge candidates, Cm. Each merge candidate in the candidate list can include a set of motion data that can be used for motion-compensated prediction.

The merge candidates can be listed in the candidate list according to a certain order. For example, depending on how the merge candidate is derived, different merge candidates may have different probabilities of being selected. The merge candidates having higher probabilities of being selected are positioned in front of the merge candidates having lower probabilities of being selected. Based on such an order, each merge candidate is associated with an index (referred to as a merge index). In one embodiment, a merge candidate having a higher probability of being selected will have a smaller index value which means fewer bits are needed for coding the respective index.

In one example, the motion data can include horizontal and vertical motion vector displacement values of one or two motion vectors, one or two reference picture indexes associated with the one or two motion vectors, and optionally an identification of which reference picture list is associated with each index.

In an example, according to a predefined order, a first number of merge candidates, C1, is derived from the spatial candidate positions {A, B, C, D, E}, and a second number of merge candidates, C2=Cm−C1, is derived from the temporal candidate positions {T0, T1}. The numerals A, B, C, D, E, T0, T1 for representing candidate positions can also be used to refer to merge candidates. For example, a merge candidate obtained from candidate position A is referred to as the merge candidate A.

In some scenarios, a merge candidate at a candidate position may be unavailable. For example, a candidate block at a candidate position can be intra-predicted, outside of a slice or tile including the current block (810), or not in a same coding tree block (CTB) row as the current block (810). In some scenarios, a merge candidate at a candidate position may be redundant. For example, one neighbor block of the current block (810) can overlap two candidate positions. The redundant merge candidate can be removed from the candidate list. When a total number of available merge candidates in the candidate list is smaller than the maximum number of merge candidates C, additional merge candidates can be generated (for example, according to a preconfigured rule) to fill the candidate list such that the candidate list can be maintained to have a fixed length. For example, additional merge candidates can include combined bi-predictive candidates and zero motion vector candidates.

After the candidate list is constructed, at an encoder, an evaluation process can be performed to select a merge candidate from the candidate list. For example, RD performance corresponding to each merge candidate can be calculated, and the one with the best RD performance can be selected. Accordingly, a merge index associated with the selected merge candidate can be determined for the current block (810) and signaled to a decoder.

At a decoder, the merge index of the current block (810) can be received. A similar candidate list construction process, as described above, can be performed to generate a candidate list that is the same as the candidate list generated at the encoder side. After the candidate list is constructed, a merge candidate can be selected from the candidate list based on the received merge index without performing any evaluations in some examples. Motion data of the selected merge candidate can be used for a subsequent motion-compensated prediction of the current block (810).

A skip mode is also introduced in HEVC. For example, in skip mode, a current block can be predicted using a merge mode as described above to determine a set of motion data, however, no residue is generated, and no transform coefficients are transmitted. A skip flag can be associated with the current block. The skip flag and a merge index indicating the related motion information of the current block can be signaled to a video decoder. For example, at the beginning of a coding unit (CU) in an inter-picture prediction slice, a skip flag can be signaled that implies the following: the CU only contains one PU (2N×2N); the merge mode is used to derive the motion data; and no residual data is present in the bitstream. At the decoder side, based on the skip flag, a prediction block can be determined based on the merge index for decoding a respective current block without adding residue signals. Thus, various methods for video coding with merge mode disclosed herein can be utilized in combination with a skip mode.

I. 2 Merge Mode in Versatile Video Coding

Versatile Video Coding (VVC) is a video coding standard being developed by Joint Video Exploration Team (JVET). In VVC, sub-CU modes and sub-CU merge candidates are introduced. The sub-CU modes include an alternative temporal motion vector prediction (ATMVP) mode and a spatial-temporal motion vector prediction (STMVP) mode. The sub-CU modes can be enabled to obtain additional merge candidates. No additional syntax element is used to signal the sub-CU modes. Two additional sub-CU merge candidates (an ATMVP candidate and a STMVP candidate) can be derived and added to a merge candidate list of each CU to represent the ATMVP mode and STMVP mode, respectively. Compared with a candidate list of HEVC, up to seven merge candidates are used, if a sequence parameter set indicates that ATMVP and STMVP are enabled. Sub-CU merge candidates can also be referred to as sub-block based candidates. An ATMVP candidate can also be referred to as a sub-block based ATMVP candidate or a sub-block based TMVP candidate. A STMVP candidate can also be referred to as a sub-block based STMVP candidate.

The encoding logic of the additional merge candidates (ATMVP and STMVP) is similar to that of the merge candidates in the HEVC. For example, for each CU in a P or B slice, two more rate distortion performance based checks are needed for the two additional sub-CU merge candidates. In one example, merge candidates are inserted or added to a candidate list according to the following order: spatial merge candidates (e.g., candidates A, B, C, and D), sub-CU merge candidates (e.g., candidates ATMVP and STMVP), candidate E (when the merge candidates in the list are less than 6), temporal merge candidate (TMVP), combined bi-predictive candidates and zero motion vector candidates. In one example, given a length of a candidate list (e.g., 7), when available merge candidates with higher priorities based on the above order cannot fully fill the candidate list, merge candidates with lower priorities can be used to fill the candidate list.

Figure 9:
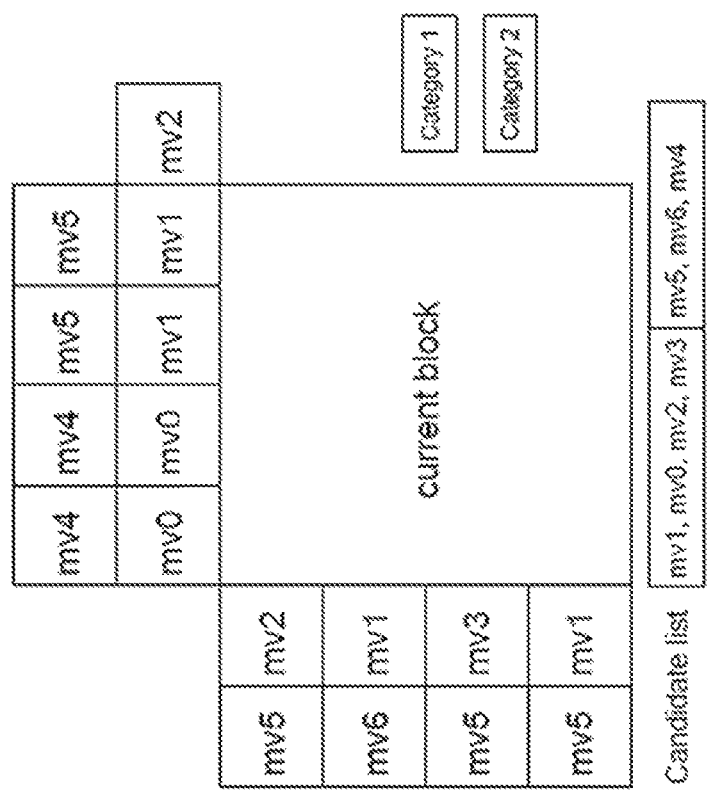
FIG. 9 shows an example scheme for merge candidate list construction.

I. 3. Merge Candidate List Construction Based on Candidate Motion Vectors from Previously Coded Blocks not Immediately Adjacent to Current Block FIG. 9 shows exemplary motion vectors for merge candidate list construction. The construction scheme searches candidate motion vectors from previously coded blocks, with a step size of 8×8 samples block. The scheme defines the nearest spatial neighbors, i.e., immediate top row, left column, and top-right corner, as category 1. The outer regions (maximum three 8×8 blocks away from the current block boundary) and the co-located blocks in the previously coded picture are classified as category 2. The neighbor blocks that are predicted from different reference pictures or are intra coded are pruned from the list. The remaining reference blocks are then each assigned a weight. The weight is related to the distance to the current block.

I. 4. Merge Mode with Merge Candidates from Extended Region

Figure 10:
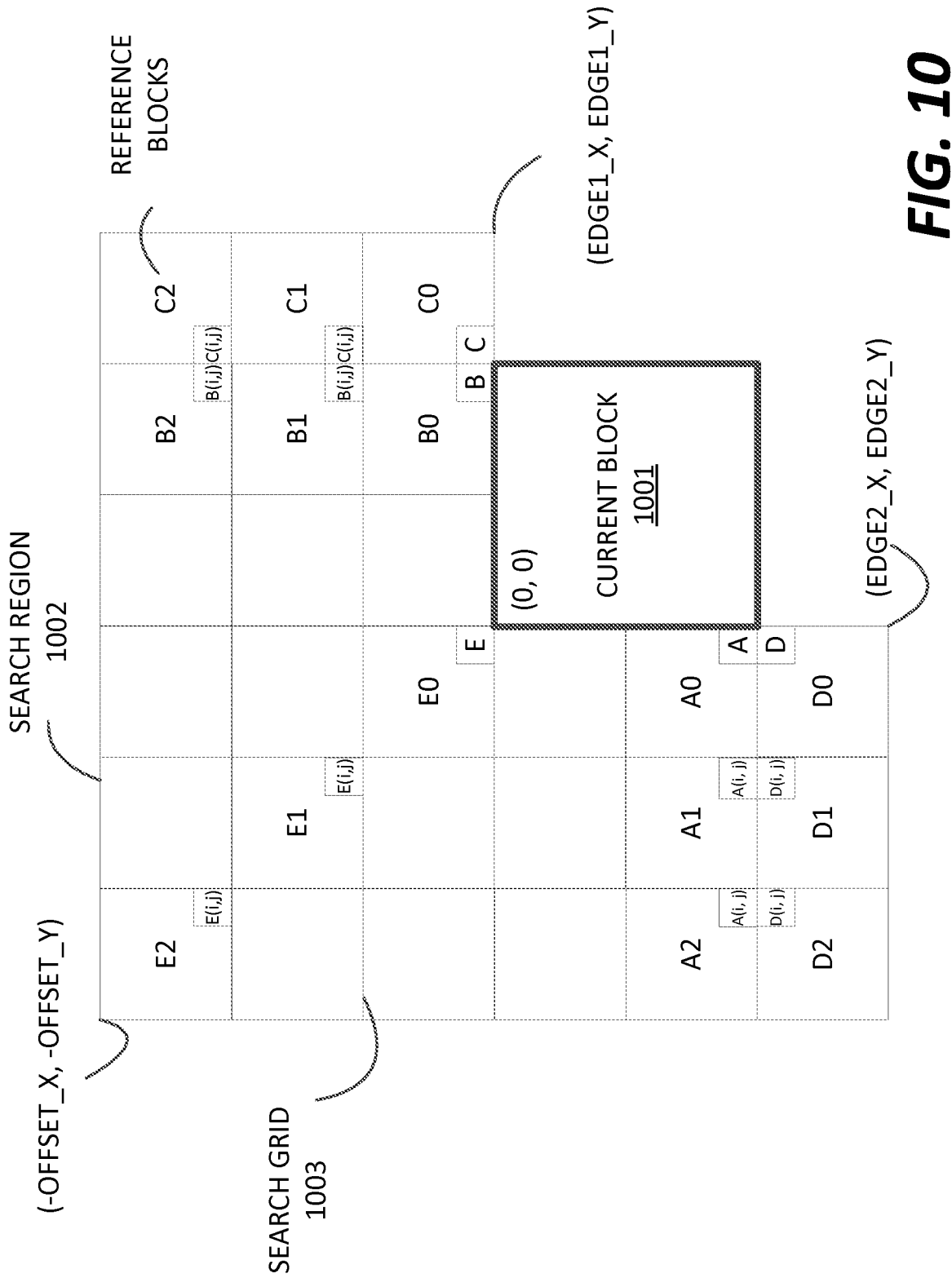
FIG. 10 shows an example of searching for merge candidates over an extended region neighboring a current block.

FIG. 10 shows an exemplary extended region neighboring a current block (1001). A search method is performed for merge candidates over the extended region neighboring the current block (1001). The search method can be an extension to the methods specified by JVET and HEVC. As shown, a search region (1002) neighboring a current block (1001) is defined, for example, with three pairs of coordinates (−Offset_x, −Offset_y), (Edge1_x, Edge1_y), and (Edge2_x, Edge2_y) with respect to a top-left corner sample (0, 0) of the current block (1001). The search region (1002) may be immediately adjacent to the current block (1002). The search region (1002) is partitioned into reference blocks using a grid pattern (1003). The resulting reference blocks may have a shape of a square or a rectangle.

In HEVC or JEM 7, spatial merge candidates can be searched at a first set of candidate positions A-E within a first set of reference blocks A0, B0, C0, D0, and E0 as shown in FIG. 10. Additional sets of candidate positions can be introduced to cover the search region (1002) which is extended from the immediate neighborhood of the current block (1001). Among the additional sets of candidate positions, a second set of candidate positions can be within a second set of reference blocks A1, B1, C1, D1, and E1, and a third set of candidate positions can be within a third set of reference blocks A2, B2, C2, D2, and E2.

As an example, as shown in FIG. 10, candidate positions A-E are represented by small blocks of a size of 4×4 samples. Candidate positions in other to-be-search reference blocks A0-E0, A1-E1, and A2-E2 can also be similarly represented by small blocks indicated by A (i, j), B (i, j), C (i, j), D (i, j), and E (i, j), where i and j are coordinates corresponding to a sample within the small blocks.

Based on the above defined search region 1002, and the specified reference blocks or candidate positions, various scan (search) orders may be used to search for merge candidates. In one example, the scan order can be from the nearest neighborhood to the furthest neighborhood. For example, reference blocks A0-E0 are first searched followed by reference blocks A1-E1, and further followed by A2-E2. In one example, the scan order can be the reverse of the above example. In addition, the scan order within each set of reference blocks A0-E0, A1-E1, and A2-E2 can vary in different examples. For example, the scan order may be A (i, j), B (i, j), C (i, j), D (i, j), E (i, j), or A (i, j), D (i, j), B (i, j), C (i, j), E (i, j), or other orders.

II. 5 Motion Information Differential Coding Mode

In some examples, motion information of a current block can be encoded with a predictive coding method. For example, instead of using a merge mode or skip mode, a motion vector of an inter-picture-predicted block can be differentially coded using a MV predictor. For example, similar to constructing a merge candidate list in the merge mode as described herein, a set of MV predictors can be selected from a set of MV predictor candidate positions to construct a list of MV predictor candidates. A MV predictor can then be selected among the multiple MV predictor candidates on the candidate list. A difference between the MV predictor and the actual motion vector and an index of the selected MV predictor candidate can be transmitted from an encoder side to a decoder side. Such a type of motion vector prediction processing is referred to as the motion information differential coding mode, or motion information predictive coding mode in some examples. In some other examples, the motion information differential coding mode is referred to as an advanced motion vector prediction (AMVP) mode.

In some examples, the candidate positions defined in FIG. 8 are used as MV predictor candidate positions for construction of a MV predictor candidate list. In one example, two spatial motion candidates are selected according to availabilities among the five spatial candidates in FIG. 8 to construct a MV predictor candidate list. The first spatial motion candidate can be selected from the set of left positions {A, D} and the second one can be selected from the set of above positions {C, B, E} according to their availabilities, while following the search order indicated in the two sets. If no valid motion vector can be found from the two sets of positions, no candidates would be filled in the MV predictor list. A pruning operation may be performed to remove redundant candidates from the list. When the number of available spatial MV predictors is not equal to two (or is less than two), the temporal motion candidates at the set of positions {T0, T1} will be considered according to their availabilities and the searching order indicated in the set. Finally, a zero motion vector is included repeatedly until the number of MV predictor candidates is equal to two.

The current block and neighboring blocks in FIG. 8 can be a uni-directional or bi-directional block, and thus may be associated with one or two reference picture lists (L0 and L1). When the current block is a bi-directional block having two associated MVs, the above MV predictor candidate list construction process can be performed twice for each MV.

The MVs of the current block and a candidate block may be associated with different reference picture lists (L0 or L1) or different reference pictures (different reference picture indexes). When the reference picture index of a neighboring candidate block is not equal to that of the current block, a scaled version of the respective motion vector is used. For example, the respective neighboring MV is scaled according to the temporal distances between the current picture and the reference pictures indicated by the indexes of the neighboring block and the current block.

In some examples, in addition to using motion information from spatial or temporal neighboring blocks of a current block as motion information predictors, sub-block based motion candidates (as described in the section I. 2 of this disclosure) can also be used as motion information predictors in a motion information differential coding mode. Such sub-block based motion candidates, when used in a motion information differential coding mode, can be referred to as sub-block based motion predictors.

I. 6. Examples of Affine Motion Model Based Motion Compensation and Affine Motion Information Prediction In HEVC, a block matching algorithm is employed to find a best match block in a reference picture. The best match block is shifted by a motion vector with respect to a current block, and is used as a prediction of the current block. Motion compensation can be performed based on the best match block. The block matching algorithm is generally based on a translational motion model, and assumes that the motion of samples within the current block is uniform. Such a translational motion model based algorithm cannot efficiently characterize some complex motions, such as rotation, scaling and other deformations, of moving objects.

In contrast, for a current bock corresponding to an object moving with affine motion, affine motion model based prediction can efficiently determine motion information for samples within the current block, thus can find a better prediction block. For example, in an affine coded or described coding block, different parts of the samples can have different motion vectors. The basic unit to have a motion vector in an affine coded or described block is referred to as a sub-block. A size of the sub-block can be as small as 1 sample, and can be as large as a size of the current block.

When an affine motion model is determined, a motion vector with respect to a target reference picture for each sample in the current block can be derived based on the affine motion model. However, in order to reduce implementation complexity, in some examples, affine motion compensation is performed on a sub-block basis instead of a sample basis. For example, a motion vector can be derived using the affine motion model for each sub-block. For samples in a same sub-block, the motion vector is the same. A specific location within each sub-block, such as a top-left or center point of the respective sub-block, is used as a representation location for deriving the respective motion vector. In one example, a sub-block has a size of 4×4 samples.

I. 6. 1. Affine Motion Model with Six Affine Motion Parameters (AMPs)

Generally, an affine motion model useful for deriving motion information of a block can be represented and defined with 6 AMPs. The 6-AMPs-based affine motion model can also be represented by 3 motion vectors at different locations of the block.

When an affine motion model is defined by 6 AMPs, a motion vector of a sample in a current block can be derived using the 6 AMPs. For example, a two dimensional (2D) affine transform can be described as $$\begin{cases} x' = ax + by + e \\ y' = ca + dy + f \end{cases} \quad (1)$$

where (x, y) and (x', y') are a pair of corresponding locations in current and reference pictures, respectively, and a, b, c, d, e, and f are the 6 AMPs. Let (Vx, Vy)=(x−x', y−y') be the motion vector at location (x, y) in the current picture. Then, the motion vector can be determined according to $$\begin{cases} Vx = (1-a)x - by - e \\ Vy = (1-c)x - dy - f \end{cases} \quad (2)$$

As shown, the motion vector (Vx, Vy) at location (x, y) can be determined according to the 6 AMPs. As the 6 AMPs can define the respective affine motion model, the 6 AMPs can be used to refer to the affine motion model.

Figure 11:
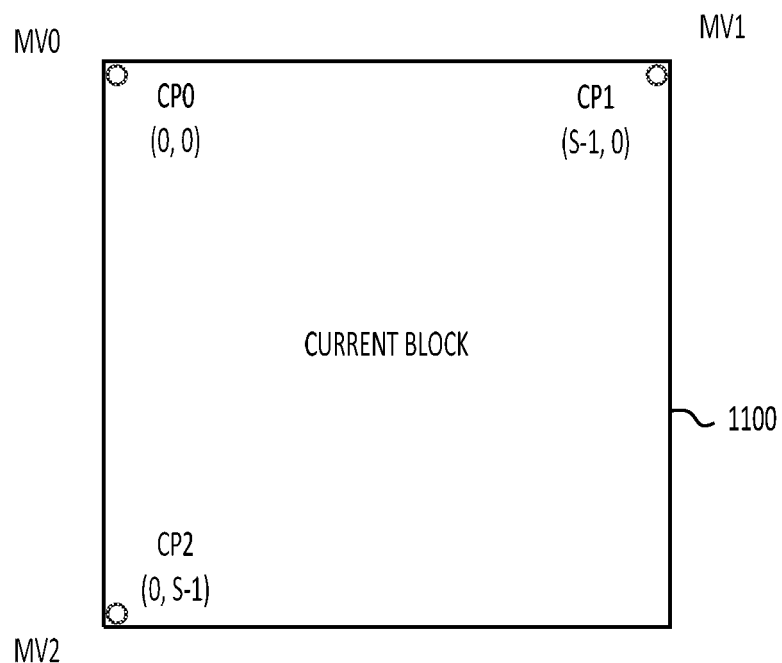
FIG. 11 shows a representation of an affine motion model with 3 motion vectors according to an embodiment of the disclosure.

FIG. 11 shows a representation of an affine motion model with 3 motion vectors according to an embodiment of the disclosure. As shown, a current block (1100) has a size of S×S samples. Three motion vectors MV0, MV1, and MV2 at the three corners of the current block (1100) are used to represent the affine motion model. Specifically, the three motion vectors MV0, MV1, and MV2 correspond to three samples with coordinates of (0, 0), (S−1, 0) and (0, S−1) within the current block. The locations of the three samples are referred to as control points (CPs). The three respective motion vectors can be referred to as control point motion vectors (CPMVs).

Figure 12:
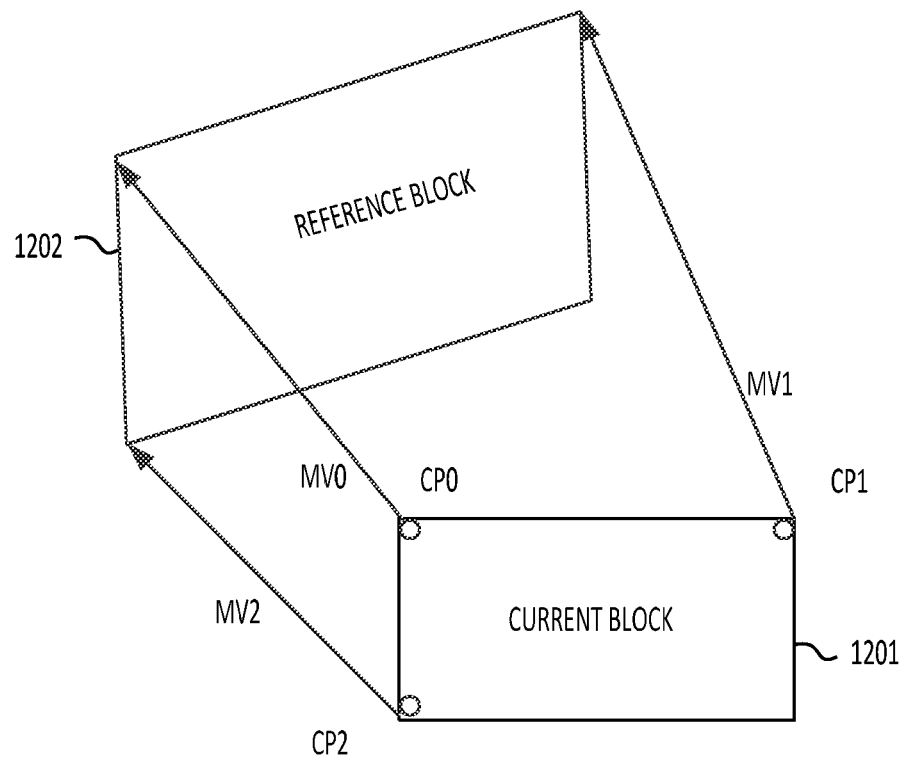
FIG. 12 shows an example of determining a reference block using motion vectors at three control points, CP0, CP1, and CP2 of a current block.

FIG. 12 shows an example of determining a reference block (1202) using motion vectors at three control points, CP0, CP1, and CP2 of a current block (1201). As shown, after the affine transformation, a rectangular block becomes a parallelogram.

When an affine model is defined by three CPMVs of a current block, a motion vector MV(x, y) of a sample (x, y) in the current block can be derived using the three CPMVs. For example, with reference to FIG. 11, the motion vector MV(x, y) can be determined according to $$MV(x,y) = \Sigma_{k=0}^{2} m_k(x,y) MV_k \quad (3)$$

where $$m_0(x, y) = 1 - \frac{x}{S-1} - \frac{y}{S-1}, m_1(x, y) = \frac{x}{S-1}, m_2(x, y) = \frac{y}{S-1}.$$

As shown, the motion vector MV(x, y) of the sample (x, y) is a linear combination of the CPMVs: MV0, MV1, and MV2. Accordingly, the motions of the three corners control the motion of all the samples in the block 1100. Accordingly, the CPMVs can be used to refer to or representative the respective affine motion model.

I. 6. 2. Affine Motion Model with Four AMPs

In another example, a simplified version of the affine motion model is defined with 4 AMPs. In the simplified affine motion model, an assumption is made that a shape of a block does not change after the affine transformation. Accordingly, a rectangular block will remain rectangular, and the respect aspect ratio will not change after the transformation. The simplified affine motion model can be represented with a pair of motion vectors at two control points.

Figure 13:
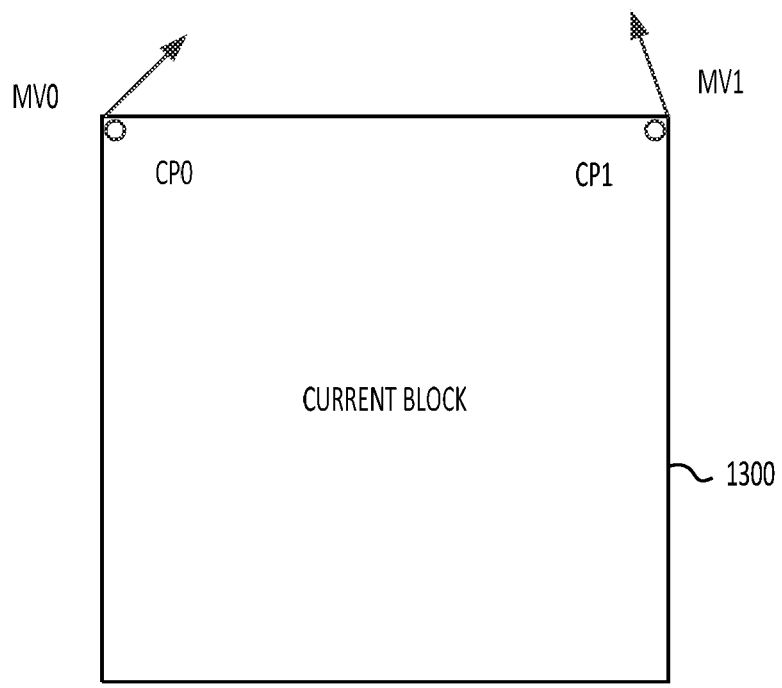
FIG. 13 shows a representation of a simplified affine motion model with 2 motion vectors according to an embodiment of the disclosure.

FIG. 13 shows a representation of a simplified affine motion model with 2 motion vectors according to an embodiment of the disclosure. As shown, the motion vectors MV0 and MV1 at control points CP0 and CP1 of a current block 1300 can be used to represent the simplified affine motion model for the current block 1300.

Figure 14:
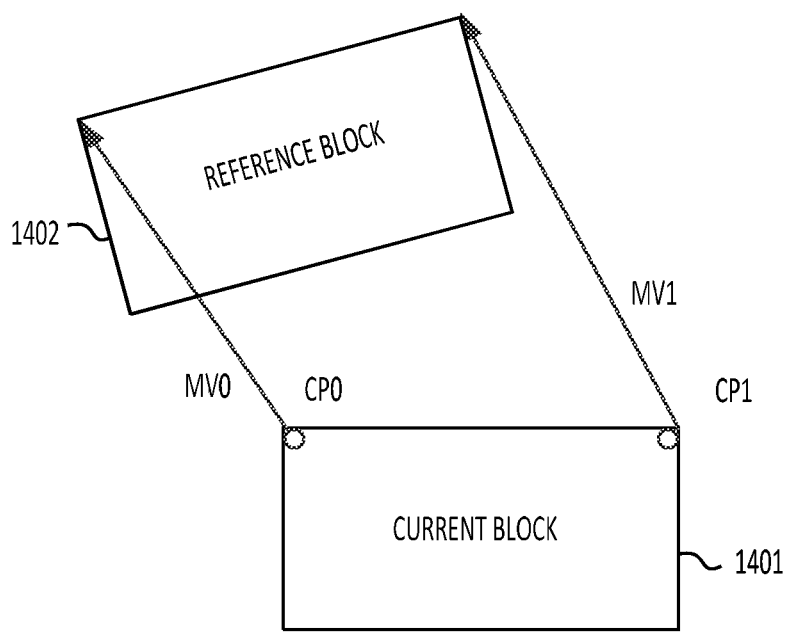
FIG. 14 shows an example of determining a reference block using motion vectors MV0 and MV1 at two control points, CP0 and CP1 of a current block.

FIG. 14 shows an example of determining a reference block (1402) using motion vectors MV0 and MV1 at two control points, CP0, and CP1 of a current block (1401). As shown, after the affine transformation, a rectangular block maintains its shape.

When a simplified affine motion model of a current block is defined by 4 AMPs, a motion vector of a sample in the current block can be derived using the 4 AMPs. For example, a two dimensional (2D) affine transform using the 4-parameter affine motion model can be described as $$\begin{cases} x' = \rho\cos\theta \cdot x + \rho\sin\theta \cdot y + c \\ y' = -\rho\sin\theta \cdot x + \rho\cos\theta \cdot y + f \end{cases} \quad (4)$$

wherein where (x, y) and (x', y') are a pair of corresponding locations in a current and reference pictures, respectively), and ρ, θ, c, and f are the 4 AMPs. Specifically, ρ is a scaling factor for zooming, θ is an angular factor for rotation, and (c, f) is a motion vector to describe the translational motion.

For each arbitrary position (x, y) in the current block, respective motion vectors pointing to the reference picture can be determined based on the corresponding pixel correspondences (x', y') in the reference picture using expression (4). The motion vector MV for position (x, y) in the current picture can be MV=(x−x', y−y'). The affine compensation is performed by dividing the whole current block into an array of small units. The pixels within a unit share a same motion vector. A representation location of each unit is determined by using a selected location in this unit, such as the top-left pixel, the center of the unit, etc. The size of the small unit for affine compensation can be 1 pixel, 4×4 samples, M×N samples, etc.

When a simplified affine model is defined by two CPMVs of a current block, with reference to the FIG. 13 example, a motion vector ($v_x$, $v_y$) of a sample (x, y) in the current block (1300) can be derived using the two CPMVs: MV0 and MV1, according to $$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (5)$$

where ($v_{0x}$, $v_{0y}$) is the motion vector MV0 of the top-left corner control point, CP0, and ($v_{1x}$, $v_{1y}$) is the motion vector MV1 of the top-right corner control point, CP1.

I. 6. 3. Affine Advanced Motion Vector Prediction (AMVP) Mode

Similar to advanced motion vector prediction (AMVP) mode in HEVC, in affine AMVP mode, an affine motion information predictor (or affine predictor) candidate list can be constructed for predicting affine motion information of a current block. The to-be-predicted affine motion information can be AMPs (e.g., the 6 or 4 parameters in expressions (1) or (4) for defining an affine motion model), or CPMVs in different examples.

In one example, the CPMVs are to be predicted. Because there is more than one motion vector to be predicted, affine motion predictor candidates in a candidate list are organized in a grouped way such that each affine predictor candidate in the list contains a set of motion vector predictors for all control points. For example, when three CPMVs are employed for defining an affine motion model, the candidate list can include: candidate 1={predictor for control point A, predictor for control point B, predictor for control point C}; candidate 2={predictor for control point A, predictor for control point B, predictor for control point C}, and the like. The predictor for the same control point in different candidates can be the same or different. The motion vector predictors for each control point in each candidate can be from a neighbor block. When an affine motion candidate is selected from the above list, predictor motion vectors in the selected affine motion candidate can be used to predictively coding CPMVs of the current block. Such an affine motion prediction where a set of motion vectors of neighbor blocks corresponding to control points of a current block are used as an affine motion candidate is referred to as a control point based affine motion prediction.

After prediction based on the candidate list, the differences of the AMPs or the CPMVs between a set of actual motion information and a candidate on the candidate list are signaled. A motion vector predictor flag will be used to indicate which candidate from the list is chosen.

In other examples, when constructing the affine AMVP candidate list, the affine motion predictor candidates in the list can each include CPMVs representing an affine model of an affine coded neighbor block. Based on such an affine motion predictor candidate, a set of CPMVs of a current affine coded block can be derived based on the respective CPMVs of the affine coded neighbor block. The derived CPMVs can subsequently be used for predictively coding affine motion information of the current affine coded block. Such an affine motion prediction where a set of CPMVs representing an affine model of a neighbor block are used as an affine motion candidate is referred to as a model based affine motion prediction.

Figure 15:
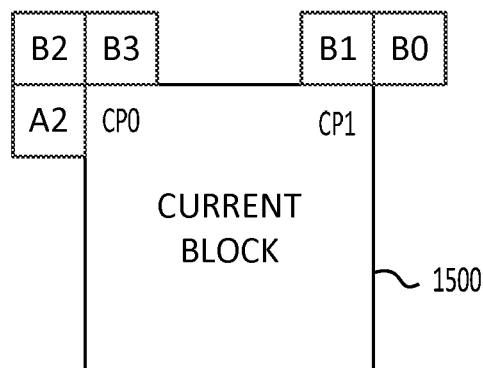
FIG. 15 shows an example of neighbor blocks that provided control point motion vector (CPMV) predictors used in affine advanced motion vector prediction (AMVP) candidate list construction.

FIG. 15 shows an example of CPMV predictors used in affine AMVP candidate list construction. The CPMV predictors are from neighbor motion vectors. A candidate list with motion vector pairs of $\{(V0, V1)|V0=\{V_{B2}, V_{B3}, V_{A2}\}, V1=\{V_{B1}, V_{B0}\}\}$ is constructed using the neighbor blocks for prediction of CPMVs at control points CP0 and CP1 of a current block (1500). As shown, V0 is selected from the motion vectors of the blocks B2, B3 or A2. The motion vector from the neighboring blocks is scaled according to time distance between reference pictures of the current block and the respective neighbor block providing the motion vector. If the number of available candidates in the candidate list is smaller than 2, the list is padded by the motion vector pair composed by duplicating an available AMVP candidate. When the number of available candidates is more than two, the candidates are firstly sorted according to the consistency of the neighboring motion vectors (similarity of the two motion vectors in a pair candidate) and only the first two candidates are kept.

A RD cost check is used to determine which motion vector pair candidate is selected as the affine predictors of the current block (1500). An index indicating the position of the selected candidate in the candidate list is signaled in the bitstream. After an affine motion estimation is applied and the actual CMVPs of the current block are found, the difference of the actual CMVPs and the affine predictors selected from the affine candidate list is signaled in the bitstream.

I. 6. 4. Affine Merge Mode

Similar to the merge mode in HEVC, in an affine merge mode, an affine motion information candidate list, referred to as an affine merge candidate list, can be constructed for deriving affine motion information of a current block.

The affine information of the current block is derived from previously affine coded blocks. In one method, it is assumed that the reference block and the current block are in the same affine object so that the MVs at the control points of the current block can be derived from the reference block's model. The MVs at the current block's other locations are linearly modified in the same way as the MV from one control point to another in the reference block. This method is referred to as model based affine prediction in merge mode which is similar to the model based affine prediction in AMVP mode described above. In the model based affine prediction, for both merge mode and AMVP mode, an affine motion candidate in a candidate list can be a set of CPMVs of a neighbor block.

In another method, motion vectors of neighboring blocks are used directly as the motion vectors at the current block's control points. Then motion vectors of samples within the block (except the control points) are generated using the information from the control points. This method is referred to as control point based affine prediction in merge mode which is similar to the control point based affine prediction in AMVP mode described above. In the control point based affine prediction, for both merge mode and AMVP mode, an affine motion candidate in a candidate list can be a set of motion vectors that each correspond to a control point of a current block and come from a neighbor block of the current block.

In either method, an index referring to a selected merge candidate on the merge candidate list is signaled, however, no residue (differential) components of the MVs for the current block are to be signaled (this is different from the affine AMVP where differential coding of MVs is used). They are assumed to be zero.

I. 6. 4. 1. Model Based Affine Merge Mode

Figure 16:
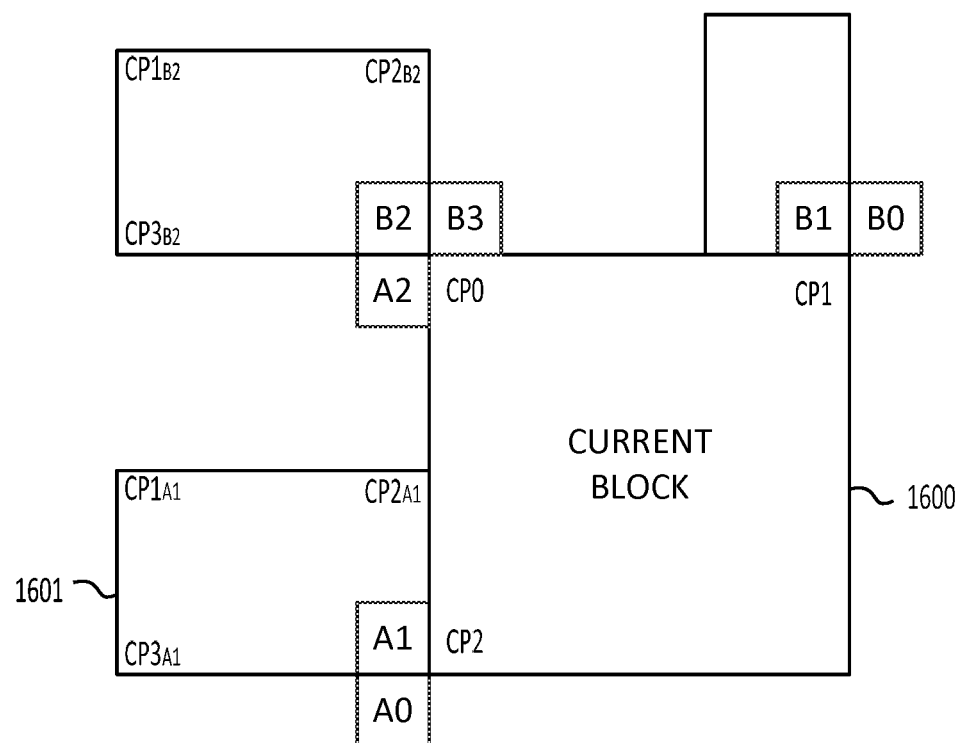
FIG. 16 shows an example of candidate blocks for merge candidate list construction in a model based affine merge mode.

FIG. 16 shows an example of candidate blocks for merge candidate list construction in a model based affine merge mode. For example, when a current block (1600) is processed with the model based affine merge mode, the first block coded with an affine mode selected from the valid neighboring reconstructed candidate blocks is used to provide affine motion information candidate. The selection order for the candidate blocks is from left, above, above right, left bottom to above left, as depicted in FIG. 16, or represented by the following order: {A1, B1, B0, A0, B2}. If the neighboring left block A1 is coded in affine mode, the motion vectors, $CP1_{A1}$, $CP2_{A1}$, and $CP3_{A1}$, of the top left corner, above right corner and left bottom corner of a coding block (1601) which contains the block A1 are derived. The motion vectors, $CP1_{A1}$, $CP2_{A1}$, and $CP3_{A1}$, form the affine motion model of the coding block (1601). Accordingly, the CPMVs of the current block (1600) at control points CP0, CP1 and CP1 can be calculated according to the motion vectors of $CP1_{A1}$, $CP2_{A1}$, and $CP3_{A1}$.

For example, let (mv0x, mv0y), (mv1x, mv1y), (mv2x, mv2y) denote the motion vectors of merge candidate A1's control points $CP1_{A1}$, $CP2_{A1}$, and $CP3_{A1}$, and let (V0x, V0y), (V1x, V1y), and (V2x, V2y) denote the motion vectors of the current block's control points CP0, CP1, and CP2. The motion vectors of the current block's control points may be derived as:

$$V0x=mv0x+(mv2x-mv0x)*(CurrY-OrgY)/Horg+(mv1x-mv0x)*(CurrX-OrgX)/Worg$$

$$V0y=mv0y+(mv2y-mv0y)*(CurrY-OrgY)/Horg+(mv1y-mv0y)*(CurrX-OrgX)/Worg$$

$$V1x=(mv1x-mv0x)*Wcur/Worg+mv0x$$

$$V1y=(mv1y-mv0y)*Wcur/Worg+mv0y$$

$$V2x=(mv2x-mv0x)*Hcur/Horg+mv0x$$

$$V2y=(mv2y-mv0y)*Hcur/Horg+mv0y$$

Where (CurrX, CurrY) are a luma pixel position of the current block (1600) in the picture, (OrgX, OrgY) are a luma pixel position of the merge candidate block A1 (1601). Worg and Horg are the width and height of the candidate block (1601). Wcur and Hcur are the width and height of the current block (1600).

In one example, after the MVs of the current block's control points CP1 and CP2 are derived, according to the simplified affine motion model, a motion vector field (MVF) of the current block (1600) is generated. In order to identify whether the current block (1600) is coded with the affine merge mode, an affine flag is signaled in the bitstream when there is at least one neighboring block that is coded in the affine mode.

I. 6. 4. 2. Control Points Based Affine Merge Mode

An example of affine merge candidate list construction in a control points based affine merge mode is described with reference to FIGS. 17A-17B. A list of candidate affine motion models is created to be the affine merge candidate list of a current block (1700). Each candidate affine motion model in the list is represented by motion information at the control points CP1-CP4 of the current block (1700). The motion information at the control points CP1-CP4 are selected from neighboring blocks corresponding to each of the control points CP1-CP4.

FIG. 17A shows spatial candidate positions for selecting motion information for the control points CP1-CP3. FIG. 17B shows a temporal candidate position at a temporal co-located block (1701) for selecting motion information for the control point CP4. The motion information of each control point CP1-CP4 can be determined in the following priority order:

1) For CP1, the checking order is B2, A2, and B3;
2) For CP2, the checking order is B0 and B1;
3) For CP3, the checking order is A0 and A1;
4) For CP4, $T_{Rb}$ is used.

The control points are used to construct a merge candidate list according to the following order:

Affine (CP2, CP3);
Affine (CP1, CP3);
Affine (CP1, CP2, CP3);
Affine (CP1, CP2);
Affine (CP2, CP4);
Affine (CP3, CP4);
Affine (CP1, CP4);
Bilinear;
Affine (CP1, CP2, CP4);
Affine (CP2, CP3, CP4);
Affine (CP1, CP3, CP4).

In one example, only when motion information of all selected control points in each candidate model is available and not identical with each other (considering reference picture indexes), the respective candidate model is included in the candidate list.

II. History-Based Affine Motion Information Prediction

Aspects of the disclosure provide a history-based affine motion information prediction mechanism to provide affine motion information candidates for coding affine motion information in affine inter-picture prediction processing. A buffer is used to store history affine motion information of previously processed affine coded blocks. Such a buffer is referred to as an affine history-based motion vector prediction (HMVP) buffer. The affine motion information corresponding to an affine coded block in the HMVP buffer is referred to as an affine motion information candidate of the HMVP buffer. The affine coded blocks refer to blocks that are processed with an inter-picture prediction method that is based on an affine motion model. Examples of the inter-picture prediction method based on an affine motion model include the above described affine AMVP mode (e.g., model based or control points based), affine merge mode (e.g., model based or control points based), a history-based affine motion information differential coding mode, or a history-based affine merge mode described herein.

In a history-based affine merge mode, affine motion candidates can be selected from the affine HMVP buffer to create a merge candidate list for affine motion information prediction in merge mode. In a history-based affine motion information differential coding mode (or history-based affine motion information prediction mode), affine motion candidates can be selected from the affine HMVP buffer to create a candidate list for affine motion information differential coding, in a way that is similar to the way the candidate list is used in the affine AMVP mode.

II. 1. Affine Motion Information Candidates in Affine HMVP Buffer

FIG. 18 shows an example of an affine HMVP buffer (1800) according to an embodiment of the disclosure. The buffer (1800) includes N number of entries with indexes from 0 to N−1. Each entry corresponds to an affine motion information candidate, and includes recorded affine motion information from a previous affine coded block.

In one example, the size N of the buffer (1800) is predefined with a value of 8, 10, 20, or the like. In one example, a value of N depends on other coding parameters. For example, the value of N may be determined by a luma picture resolution. A higher luma picture resolution may be configured with a larger N. For example, the value of N may be determined by a maximum coding block size.

The buffer (1800) can be maintained during an encoding or decoding process. The buffer (1800) may be maintained in a first-in-first-out manner. For example, when a new entry is added into the buffer (1800), existing entries are moved towards position N−1. The new entry is put in position 0 (the latest position). If the buffer (1800) is already full, the existing entry at position N−1 will be shifted out of (removed from) the buffer (1800).

It is noted that the buffer (1800) can be implemented with software or hardware in different examples. For example, the buffer (1800) can be implemented as a table with software, or may be implemented with a physical memory circuit.

II. 2. Representation of Affine Motion Information in Affine HMVP Buffer

In one embodiment, affine motion information of each entry of the affine HMVP buffer (1800) may contain motion information of control points of the respective affine coded block. The motion information of control points refers to information of CPMVs of the respective affine coded block. For example, the motion information of control points may include motion vector values (e.g., vertical and horizontal displacements) of each motion vector at the respective control points, a reference picture index associated with the CPMVs, and optionally, a reference picture list associated with the CPMVs when two reference picture lists are employed.

For example, in the 4-parameter affine case, motion information of 2 control points may be saved. In the 6-parameter affine case, motion information of 3 control points may be saved. In one example, if 4-parameter and 6-parameters affine motion models are both possible, motion information of 3 control points are saved. For example, if a block is coded with 4-parameter affine motion model, motion information of a third control point is derived from affine motion information of the other two control points.

In some examples, additional information of the affine coded block may be saved, such as (but not limited to), a position, width, and/or height of the affine coded block.

When an affine motion information candidate in the affine HMVP buffer (1800) is selected and used for affine inter-picture prediction, motion information of a current coding block's control points may be derived from motion information of control points, and information of position, width, and height of the selected candidate in the affine HMVP buffer (1800), in a manner similar to examples of model based prediction in merge mode or AMVP mode described above.

In another embodiment, each entry of the affine HMVP buffer (1800) may contain AMPs of the respective affine coded block. The AMPs may include necessary information to derive an affine model, such as parameters c, f, ρ, and θ in expression (4) in a four-parameter affine model, or parameters a, b, c, d, e, and f in expression (1) in a six-parameter model. Similarly, additional information of the affine coded block may be saved, such as (but not limited to), a position, width, and/or height of the block. When an entry is being used for an affine inter-picture prediction, the AMPs from the selected candidate may be applied to a current block. The current block's control point motion information (information of the CPMVs) may be derived from those AMPs.

In a further embodiment, each entry of the affine HMVP buffer may contain some of the affine motion parameters of the corresponding affine coded block. The affine motion parameters may include necessary information to derive an affine model, such as scaling/zooming parameters (as ρ in expression (4)), rotational parameters (as θ in expression (4)). Or, each entry may contain the MV difference in the affine coded block along the x direction at a minimum possible distance (such as 4 pixel wide), and/or the MV difference in the affine coded block along the y direction at a minimum possible distance (such as 4 pixel height). Having either of the above affine related information, plus a translational motion vector predictor, the motion information at the current block's control points can be derived. The translational motion vector predictor can be a traditional motion vector predictor for any control point of the current block, such as one of the motion vectors from positions A2, B2, and B3 of the top left corner of the current block (1700) in the example of FIG. 17A.

II. 3. Pruning Process

In various embodiments, pruning may or may not be applied to the entries before the entries are added to the affine HMVP buffer (1800).

In one embodiment, no pruning is applied. Each new entry may be added to the affine HMVP buffer (1800) regardless of what is already in the buffer (1800).

In another embodiment, when motion information of control points is used in each affine HMVP buffer entry, before adding a new entry to the buffer, the affine motion information of the new entry is examined against existing entries in the buffer (1800). When the affine motion parameters or affine control point motion information of the current block derived from the new entry is the same as an existing affine HMVP buffer entry, the existing entry is removed from the buffer (1800), the following entries (entries newer than the existing entry) may be shifted forward towards position N−1, and the new entry may be added to the affine HMVP buffer (1800) at position 0. In an alternative example, the existing entry is maintained, and the new entry is not added to the buffer (1800).

In one example, when a difference between the affine motion parameters or the affine control point information derived from the new entry and that derived from an existing entry is below a threshold, the existing entry is removed from the buffer (1800), the following entries (entries newer than the existing entry) may be shifted forward towards position N−1, and the new entry may be added to the affine HMVP buffer (1800) at position 0. Alternatively, the existing entry is maintained, and the new entry is not added to the buffer (1800).

In another embodiment, when AMPs are used in each affine HMVP buffer entry, before adding a new entry to the buffer, the AMPs of the new entry are examined against existing entries in the buffer. Similarly, if the AMPs of the new entry are the same as that of an existing entry, or a difference between the AMPs of the existing entry and the new entry is below a threshold, the existing entry is removed from the buffer (1800), the following entries (entries newer than the existing entry) may be shifted forward towards position N−1, and the new entry may be added to the affine HMVP buffer (1800) at position 0. Alternatively, the existing entry is maintained, and the new entry is not added to the buffer (1800).

II. 4. Affine HMVP Buffer Maintenance

In one embodiment, the entries in the buffer (1800) may be maintained on a first in first out (FIFO) basis. In one example, a first entry is added to position 0 of the buffer (1800). When a next new entry is added to the buffer, the first entry is shifted from position 0 to position 1, and the new entry is added to position 0. When the buffer (1800) is full of N entries, and a new entry is being added, the oldest entry at position N−1 may be removed, and all other entries in the buffer are shifted towards the position N−1. The new entry may be added to the buffer (1800) as position 0 subsequently.

In another embodiment, the entries in the buffer (1800) may be maintained based on a most-frequently-used (MFU) basis. The usage can be defined in one or more of the following ways:

(1) when a new block is affine coded, and its affine model is the same as an existing entry in the affine HMVP buffer, the usage of the existing entry is increased by 1;

(2) when a new block is affine coded, and the difference between the affine motion information of the new block and an existing entry in the affine HMVP buffer (1800) is below a threshold, the usage of the existing entry is increased by 1. The difference can be evaluated in a way similar to the examples of the pruning process.

Each entry's usage count may be tracked, and the usage count information is stored along with the respective entry. The most frequently used entry may be placed at position 0 of the buffer (1800), and the second frequently used entry may be placed at position 1, and so on. When two or more entries have a same usage count value, the most recently used one will be placed at a position closer to position 0 in the buffer (1800) according to one embodiment.

In one example, the order of the entries in the affine HMVP buffer (1800) is not changed each time a new entry is added to the buffer (1800) or the usage count has changed. When the affine motion information candidates in the buffer (1800) are selected as candidates in a merge candidate list or in a candidate list for affine AMVP, the affine motion information candidates can be selected according to the usage counts associated with the respective affine motion information candidates. For example, an affine motion information candidate with a higher usage count in the buffer (1800) can be selected before one with a lower usage count.

II. 5. Affine Candidate List Construction

In various embodiments, affine motion candidates may be constructed based on an affine HMVP buffer and included in a motion candidate list. An affine motion candidate in the motion candidate list can be selected from the affine HMVP buffer or can be derived based on an affine motion candidate stored in the affine HMVP buffer. For example, in one embodiment, motion information of control points of a current block is derived based on control point motion information, position information, width and height information of a processed affine-coded coding block in one of the affine motion information candidates stored in the HMVP buffer. The derived motion information of the control points of the current block is added to the motion candidate list. In addition, affine motion candidates derived or selected from the affine HMVP buffer may also be combined with other types of affine motion candidates derived from spatial and/or temporal neighboring blocks, such as the affine motion candidates derived with the model based affine prediction method or control points based affine prediction method in merge mode or AMVP mode. For example, a candidate list for inter picture prediction coding may include different types of affine motion candidates as well as different types of non-affine motion candidates (e.g., motion candidates from neighbor blocks in merge mode, or AMVP mode).

In one embodiment, only one affine motion candidate selected from an affine HMVP buffer is employed. In one example, the FIFO maintenance method is used to maintain the affine HMVP buffer and the latest added affine motion information candidate may be used as the affine motion candidate. In one example, the MFU maintenance method is used to maintain the affine HMVP buffer and the most frequently used entry from the affine HMVP buffer may be used as the affine motion candidate.

In another embodiment, more than one affine motion candidate stored in an affine HMVP buffer are used to construct an affine motion candidate list. The affine motion candidate list can be an affine merge candidate list for affine merge mode or an affine motion information predictor candidate list for affine motion information differential coding. For example, the maximum allowed number of affine motion candidates may be M, where M<=N. In one example, the value of M may be a predefined fixed value, such as 2, 5, 10, or the like. In one example, the value of M may be configurable on the encoder side and signaled in the bit stream. In one example, the FIFO maintenance method is used to maintain the affine HMVP buffer. Accordingly, the first M latest added candidates may be added to the affine motion candidate list in a descending order (e.g., in terms of the indexes associated with each candidate in the HMVP buffer) with the latest entry at the top of the affine motion candidate list. In one example, the MFU maintenance method is used to maintain the affine HMVP buffer. Accordingly, the M most frequently used entries from the affine HMVP buffer may be added to the affine motion candidate list in a descending order in terms of the respective usage counts with the most frequently used entry on top of the affine motion candidate list.

In another embodiment, the maximum allowed number of affine motion candidates in a candidate list is M (where M<=N). Among the M affine motion candidates, R candidates may be from an affine HMVP buffer, and (M-R) candidates may be other types of affine motion candidates, such as those derived with the model based affine prediction method, the control points based affine prediction method, and/or the like. In different examples, the affine motion candidates from the affine HMVP buffer may be put before or after other types of affine motion candidates.

In some examples, when the maximum number of affine motion candidates on an affine motion candidate list is greater than 1, a candidate index may be coded in the bitstream to indicate which affine motion candidate is used for the corresponding coding block.

II. 6. Affine HMVP Buffer Operation with Consideration of Current Block's Location In one embodiment, an affine HMVP buffer is reset under certain conditions to remove dependencies between regions in a current picture. For example, the eliminated dependency may enable parallel processing on the different regions. In one example, the affine HMVP buffer is emptied or reset to a zero state (e.g., without any valid entry stored) depending on a location of a current block. For example, the affine HMVP buffer is reset when one or a combination of the following conditions are satisfied:

(i) the current block is at the beginning of a coding tree unit (CTU);

(ii) The current block is at the beginning of a tile;

(iii) the current block is at the beginning of a CTU row with wavefront parallel processing enabled;

(iv) the current block is at the beginning of a CTU row without wavefront parallel processing enabled; and (v) the current coding block is at the beginning of a slice.

In one embodiment, in addition to a first HMVP buffer, a second HMVP buffer is employed that is referred to as an affine HMVP row buffer. The first HMVP buffer is used in a way as described above. The affine HMVP row buffer may have a same size as the first HMVP buffer, and can be used to store entries in the first affine HMVP buffer at the moment when a first CTU of a CTU row is completed. Subsequently, at the beginning of a new CTU row, the first affine HMVP buffer can be filled with the entries in the HMVP row buffer. The affine HMVP row buffer is reset to a zero state at the beginning of each CTU row after the entries are copied from the affine HMVP row buffer.

Similarly, in another embodiment, for a tile row, an additional affine HMVP row buffer can be used to store entries in an affine HMVP buffer after a first CTU of the tile row is processed. Subsequently, for a first CTU of a next tile row, the affine HMVP buffer can be filled with entries in the affine HMVP row buffer. The affine HMVP row buffer is reset to a zero state at the beginning of a tile row after the entries are copied from the affine HMVP row buffer.

Figure 19:
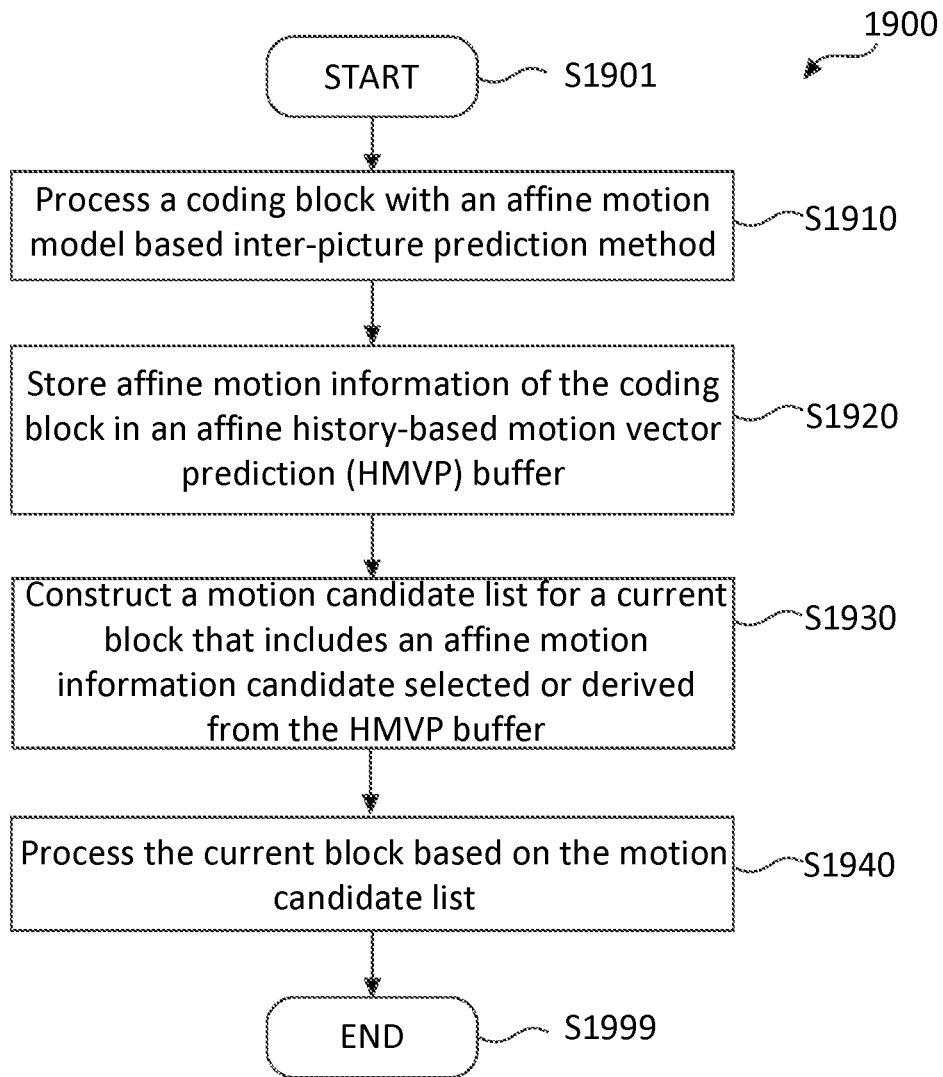
FIG. 19 shows a video coding process according to an embodiment of the disclosure.

II. 7. Example Process of Motion Candidate List Construction Based on an Affine HMVP Buffer FIG. 19 shows a video coding process (1900) according to an embodiment of the disclosure. The process (1900) can be performed by an encoder or a decoder in a video coding system. During the process (1900), a motion candidate list is constructed based on affine motion information candidates stored in an affine HMVP buffer. The process (1900) starts from (S1901) and proceeds to (S1910).

At (S1910), a coding block is processed with an affine motion model based inter-picture prediction method. In some examples, the coding block can be similar to a block of a coding unit, or a prediction unit specified in the HEVC or VVC coding standard. The block can include samples of a luma or chroma color component.

The affine motion model based inter-picture prediction method can refer to an inter-picture coding mode in which a prediction block of the coding block is determined based on a set of affine motion information or affine motion parameters, such as CPMVs, AFPs, or the like. Examples of the affine motion model based inter-picture prediction method can include coding methods in the affine AMVP mode, the model based affine merge mode, the control points based affine merge mode, the history-based affine merge mode, the history-based AMVP mode (e.g., history-based affine motion information differential coding or predictive coding), and the like. At (S1910), the coding block can be processed in an encoding process or a decoding process corresponding to the respective affine model based inter-picture prediction method. A coding block that is encoded or decoded with an affine model based inter-picture prediction method is referred to as an affined-coded block.

As the coding block is processed with the affine motion model based method, a set of affine motion information can be determined and subsequently used for determining the prediction block in either an encoder or decoder process. The set of affine motion information can include motion information of respective control points of the coding block, a set of AMPs, or information for deriving an affine motion model. The affine motion model can be a 4-parameter or a 6-parameter model. Deriving an affine motion model can refer to a process of determining a set of affine motion information (e.g., CPMVs, AFMs, and the like) that can define the affine motion model.

At (S1920), the affine motion information of the coding block is stored to the affine HMVP buffer. As described herein, the affine HMVP buffer may store a plurality of entries each corresponding to an affine-coded block. Each entry (referred to as an affine motion information candidate) includes a set of affine motion information of the respective affine-coded block. In addition, each entry may also include other useful information for deriving an affine motion model corresponding to a block under processing, such as a location of the respective affine-coded block with a respective current picture, width and height of the respective affine-coded block, and/or the like.

At (S1930), the motion candidate list is constructed for a current block. The motion candidate list can include a set of affine motion information candidates selected or derived from the HMVP buffer. The motion candidate list can also include other types of affine motion candidates (e.g., derived from spatial and/or temporal neighboring blocks, such as the affine motion candidates derived with the model based affine prediction method or control points based affine prediction method in merge mode or AMVP mode), or non-affine motion candidates (e.g., sub-block based ATMVP or STMVP candidates, motion candidates from neighbor blocks in merge mode, or AMVP mode) in various examples. As described below, the motion candidate list can be used as a merge candidate list for coding motion information of the current block with merge mode, or can be used as a motion information predictor candidate list for differential coding of motion information of the current block.

In various embodiments the motion candidate list can include various combinations of various types of motion candidates, such as the affine motion candidates from the HMVP, other types of affine motion candidates (e.g., affine motion candidates derived from spatial and/or temporal neighboring blocks using affine model based method, and/or derived using control point based method), or non-affine motion candidates (e.g., sub-block based ATMVP or STMVP motion candidates, spatial or temporal motion candidates from neighboring blocks of the current block). In addition, when constructing the candidate list, some types of motion candidates used for constructing the candidate list may or may not be available. It is not required to have one from each type of motion candidates used for constructing the candidate list. For example, in some scenarios, affine motion candidates from the HMVP buffer may not be available.

In some embodiments, the motion candidate list can solely include a set of affine motion information candidates selected or derived from the HMVP buffer, but is separate from a motion candidate list that includes non-affine motion candidates. In some embodiments, the motion candidate list can include a set of affine motion information candidates selected or derived from the HMVP buffer, and other types of affine motion candidates (derived from spatial and/or temporal neighboring blocks using affine model based method, and/or derived using control point based method), but is separate from a motion candidate list that includes non-affine motion candidates.

In some embodiments, the motion candidate list can include a set of affine motion information candidates selected or derived from the HMVP buffer, other types of affine motion candidates (e.g., derived from spatial and/or temporal neighboring blocks using affine model based method, and/or derived using control point based method), and sub-block based non-affine motion candidates (e.g., the sub-block based TMVP or STMVP candidates, but is separate from a motion candidate list that includes non-sub-block based non-affine motion candidates. As the various types of affine motion candidates are also sub-block based in some embodiments, the above sub-block based non-affine motion candidates can also be referred to as other types of sub-block based motion candidates with respect to the various types of sub-block based affine motion candidates in some embodiments. Accordingly, the above candidate list can be referred to as a sub-block based candidate list, as the candidates in the list, such as the candidates from the HMVP buffer, the candidates derived using affine model based method or control point based method, and the sub-block based non-affine motion candidates, are sub-block based. Similarly, for a sub-block based motion candidate list, when under constructing, one or more of the various types of sub-block based motion candidates may or may not be available.

In some embodiments, the motion candidate list can include affine motion candidates from the HMVP buffer, other types of affine motion candidates, as well as various types of non-affine motion candidates.

At (S1940), the current block is processed based on the motion candidate list determined at (S1930).

In one example, the motion candidate list is used as a merge candidate list for a merge mode. For example, in an encoding process of such a merge mode, merge candidates in the merge candidate list can be evaluated, and an affine merge candidate can be selected and used as affine motion information of the current block. A merge index corresponding to the selected affine merge candidate can be signaled to a respective bit stream.

In a decoding process of such a merge mode, a merge index can be received. Based on the received merge index, an affine merge candidate in the merge candidate list can be determined. Subsequently, affine motion information in the affine merge candidate can be used to determine a prediction block of the current block.

It is noted that the candidate list constructed at (S1930), when used as a merge candidate list, may include different types of affine merge candidates that are derived with different derivation methods. For example, a first type of merge candidates can be the affine merge candidates selected from the HMVP buffer. A second type of merge candidates can be merge candidates derived with the method used in the model based affine merge mode as described herein. A third type of merge candidates can be merge candidates derived with the method used in the control points based affine merge as described herein. In addition, the merge candidate list may also include non-affine merge candidates, such as sub-block based merge candidates.

In another example, the motion candidate list is used as a motion information predictor candidate list for differential coding of motion information of the current block in a motion information prediction mode. For example, respective affine motion information of the current block is coded with differential coding with respect to an affine candidate in the motion candidate list or affine motion information derived from an affine candidate in the motion candidate list. In one example, the motion candidate list includes affine motion information candidates selected or derived from the HMVP buffer, and affine motion information candidates derived from affine model based method and/or affine motion information candidates derived from control point based method, and the candidate list is used for affine motion information differential coding.

For example, at an encoder side, an affine candidate can be selected from the motion candidate list. Differences between affine motion information of or derived from the selected candidate and actual affine motion information (e.g., determined in an affine motion estimation process) of the current block can be coded and transmitted in a respective bit stream. An index associated with the selected affine candidate can be signaled in the bit stream.

For example, at a decoder side, an index indicating an affine candidate on the motion candidate list, and a set of coded affine motion information differences can be received. Based on the above received information and the motion candidate list constructed at (S1930), a set of affine motion information can be determined for the current block.

The process (1900) can proceed to (S1999), and terminate at (S1999).

The techniques described above, can be implemented as computer software using computer-readable instructions and physically stored in one or more computer-readable media. For example, FIG. 20 shows a computer system (2000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 20:
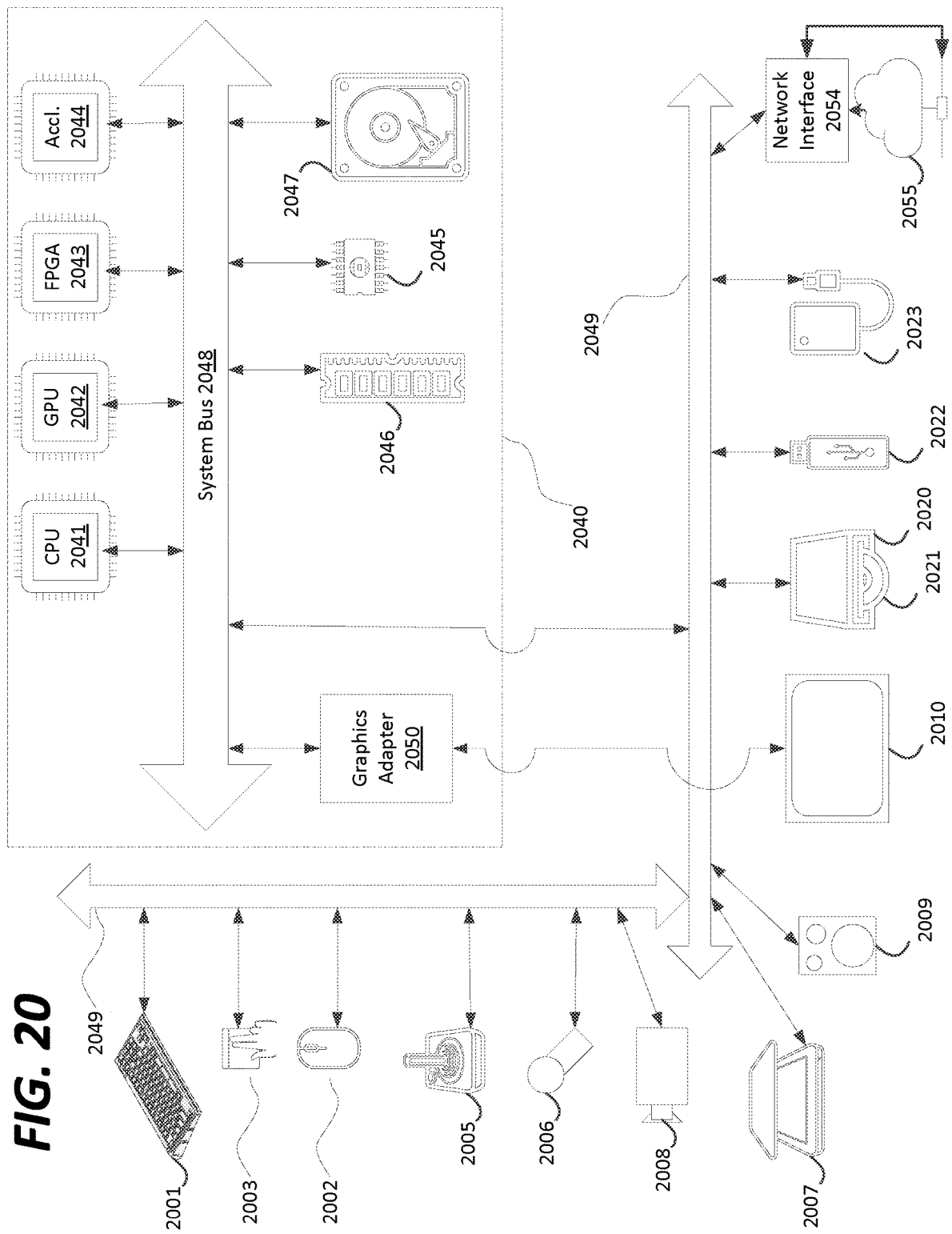
FIG. 20 is a schematic illustration of a computer system in accordance with an embodiment.

The components shown in FIG. 20 for computer system (2000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2000).

Computer system (2000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2001), mouse (2002), trackpad (2003), touch screen (2010), data-glove (not shown), joystick (2005), microphone (2006), scanner (2007), camera (2008).

Computer system (2000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2010), data-glove (not shown), or joystick (2005), but there can also be tactile feedback devices that do not serve as input devices), audio output devices (such as: speakers (2009), headphones (not depicted)), visual output devices (such as screens (2010) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (2000) can also include human accessible storage devices and their associated media such as optical media including CD/DVD ROM/RW (2020) with CD/DVD or the like media (2021), thumb-drive (2022), removable hard drive or solid state drive (2023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2000) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2049) (such as, for example USB ports of the computer system (2000)); others are commonly integrated into the core of the computer system (2000) by attachment to a system bus as described below (for example Ethernet interface into a PC computer system or cellular network interface into a smartphone computer system). Using any of these networks, computer system (2000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2040) of the computer system (2000).

The core (2040) can include one or more Central Processing Units (CPU) (2041), Graphics Processing Units (GPU) (2042), specialized programmable processing units in the form of Field Programmable Gate Areas (FPGA) (2043), hardware accelerators for certain tasks (2044), and so forth. These devices, along with Read-only memory (ROM) (2045), Random-access memory (2046), internal mass storage such as internal non-user accessible hard drives, SSDs, and the like (2047), may be connected through a system bus (2048). In some computer systems, the system bus (2048) can be accessible in the form of one or more physical plugs to enable extensions by additional CPUs, GPU, and the like. The peripheral devices can be attached either directly to the core's system bus (2048), or through a peripheral bus (2049). Architectures for a peripheral bus include PCI, USB, and the like.

CPUs (2041), GPUs (2042), FPGAs (2043), and accelerators (2044) can execute certain instructions that, in combination, can make up the aforementioned computer code. That computer code can be stored in ROM (2045) or RAM (2046). Transitional data can be also stored in RAM (2046), whereas permanent data can be stored for example, in the internal mass storage (2047). Fast storage and retrieve to any of the memory devices can be enabled through the use of cache memory, that can be closely associated with one or more CPU (2041), GPU (2042), mass storage (2047), ROM (2045), RAM (2046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2000), and specifically the core (2040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2040) that are of non-transitory nature, such as core-internal mass storage (2047) or ROM (2045). The software implementing various embodiments of the present disclosure can be stored in such devices and executed by core (2040). A computer-readable medium can include one or more memory devices or chips, according to particular needs. The software can cause the core (2040) and specifically the processors therein (including CPU, GPU, FPGA, and the like) to execute particular processes or particular parts of particular processes described herein, including defining data structures stored in RAM (2046) and modifying such data structures according to the processes defined by the software. In addition or as an alternative, the computer system can provide functionality as a result of logic hardwired or otherwise embodied in a circuit (for example: accelerator (2044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

MV: Motion Vector
HEVC: High Efficiency Video Coding
SEI: Supplementary Enhancement Information
VUI: Video Usability Information
GOPs: Groups of Pictures
TUs: Transform Units, PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
MVF: Motion Vector Field.
MVP: Motion Vector Prediction.
AMVP: Advanced Motion Vector Prediction.
ATMVP: Advanced Temporal Motion Vector Prediction
HMVP: History-based Motion Vector Prediction
STMVP: Spatial-temporal Motion Vector Prediction
TMVP: Temporal Motion Vector Prediction

What is claimed is:

1. A method, comprising:
encoding or decoding a coding block in a current picture with an affine motion model based inter-picture prediction method in a video coding system, the coding block having affine motion information that includes one or more affine motion information parameters;
determining a difference between (i) the one or more affine motion information parameters of the coding block and (ii) one or more affine motion information parameters of each entry of a history-based motion vector prediction (HMVP) buffer that is configured to store affine motion information candidates each including the one or more affine motion information parameters of a processed affine-coded coding block;
in response to a determination that the determined difference between the one or more affine motion information parameters of the coding block and the one or more affine motion information parameters of each entry in the HMVP buffer is greater than or equal to a threshold, storing the one or more affine motion information parameters of the coding block in the HMVP buffer;
constructing a motion candidate list for a current block that includes at least one candidate selected from the affine motion information candidates stored in the HMVP buffer or derived from one of the affine motion information candidates stored in the HMVP buffer;
each entry in the HMVP buffer being ordered in accordance with a frequency of use of the one or more affine motion information parameters of each entry in the HMVP buffer, the frequency of use of the one or more affine motion parameters of each entry in the HMVP buffer being determined by:
determining a difference of one or more affine motion parameters of a newly added entry in the HMVP buffer with the one or more affine motion parameters of each other entry in the HMVP buffer, and
increasing a usage count of the newly added entry by 1 for each determined difference that is less than or equal to a frequency threshold; and
reordering the newly added entry in the HMVP buffer in accordance with the usage count of the newly added entry with respect to a usage count of each other entry in the HMVP buffer such that each entry in the HMVP buffer is ordered from a highest usage count to a lowest usage count.

2. The method of claim 1, wherein the motion candidate list for the current block is one of a merge candidate list for coding motion information of the current block with a merge mode, and a motion information predictor candidate list for differential coding of motion information of the current block.

3. The method of claim 1, wherein the affine motion information of the coding block further includes motion information of each control point of the coding block that defines an affine motion model.

4. The method of claim 1, wherein the storing the affine motion information of the coding block further includes storing position information of the coding block and information of at least one of a width and a height of the coding block in the HMVP buffer.

5. The method of claim 1, wherein the motion candidate list includes affine motion candidates that are derived based on at least one of a model based affine motion information prediction method and a control point based affine motion information prediction method.

6. The method of claim 1, further comprising:
resetting the HMVP buffer when one or a combination of the following conditions are satisfied:
the coding block is a beginning of a coding tree unit (CTU);
the coding block is a beginning of a tile;
the coding block is a beginning of a CTU row with wave front parallel processing enabled;
the coding block is a beginning of a CTU row without wave front parallel processing enabled; and
the coding block is a beginning of a slice.

7. The method of claim 1, wherein the HMVP buffer is a first-in-first-out (FIFO) buffer.

8. The method of claim 1, further comprising:
deriving motion information of control points of the current block based on control point motion information, position information, width and height information of a processed affine-coded coding block in one of the affine motion candidates in the motion candidate list.

9. The method of claim 8, wherein constructing the motion candidate list for the current block comprises:
deriving motion information of control points of the current block based on control point motion information, position information, width and height information of a processed affine-coded coding block in one of the affine motion information candidates stored in the HMVP buffer; and
adding the derived motion information of the control points of the current block to the motion candidate list for the current block.

10. The method of claim 1, wherein the motion candidate list further includes one or more of affine motion candidates derived from at least one of a spatial neighboring block and a temporal neighboring block of the current block.

11. The method of claim 1, wherein the motion candidate list further includes one or more of non-affine motion candidates.

12. The method of claim 1, wherein the motion candidate list further includes one or more of affine motion candidates that are derived based on at least one of a model based affine motion information prediction method and a control point based affine motion information prediction method.

13. The method of claim 1, wherein the motion candidate list further includes one or more of sub-block based non-affine motion candidates.

14. The method of claim 13, wherein the sub-block based non-affine motion candidates includes a sub-block based temporal motion vector prediction (TMVP) motion candidate.

15. The method of claim 1, wherein the motion candidate list includes one or more of affine motion candidates that are derived based on a control point based affine motion information prediction method, and one or more of sub-block based non-affine motion candidates.

16. An apparatus for video coding, comprising:
a history-based motion vector prediction (HMVP) buffer that is configured to store, for each entry in the HMVP buffer, affine motion information candidates each including one or more affine motion information parameters of a processed affine-coded coding block, each entry in the HMVP buffer being ordered in accordance with a frequency of use of the one or more affine motion information parameters of each entry in the HMVP buffer; and
circuitry configured to:
determine the frequency of use of the one or more affine motion parameters of each entry in the HMVP buffer by:
determination of a difference of one or more affine motion parameters of a newly added entry in the HMVP buffer with the one or more affine motion parameters of each other entry in the HMVP buffer, and
increase of a usage count of the newly added entry by 1 for each determined difference that is less than or equal to a frequency threshold,
reorder the newly added entry in the HMVP buffer in accordance with the usage count of the newly added entry with respect to a usage count of each other entry in the HMVP buffer such that each entry in the HMVP buffer is ordered from a highest usage count to a lowest usage count,
encode or decode a coding block in a current picture with an affine motion model based inter-picture prediction method, the coding block having affine motion information that includes one or more affine motion information parameters,
determine a difference between (i) the one or more affine motion information parameters of the coding block and (ii) the one or more affine motion information parameters of each entry of the HMVP buffer,
in response to a determination that the determined difference between the one or more affine motion information parameters of the coding block and the one or more affine motion information parameters of each entry in the HMVP buffer is greater than or equal to a threshold, store the one or more affine motion information parameters of the coding block in the HMVP buffer, and
construct a motion candidate list for a current block that includes at least one candidate selected from the affine motion information candidates stored in the HMVP buffer or derived from one of the affine motion information candidates stored in the HMVP buffer.

17. The apparatus of claim 16, wherein the motion candidate list for the current block is one of a merge candidate list for coding motion information of the current block with a merge mode, and a motion information predictor candidate list for differential coding of motion information of the current block.

18. A non-transitory computer-readable medium storing instructions that, when executed by a computer, cause the computer to perform:
encoding or decoding a coding block in a current picture with an affine motion model based inter-picture prediction method, the coding block having affine motion information that includes one or more affine motion information parameters;
determining a difference between (i) the one or more affine motion information parameters of the coding block and (ii) one or more affine motion information parameters of each entry of a history-based motion vector prediction (HMVP) buffer that is configured to store affine motion information candidates each including the one or more affine motion information parameters of a processed affine-coded coding block;
in response to a determination that the determined difference between the one or more affine motion information parameters of the coding block and the one or more affine motion information parameters of each entry in the HMVP buffer is greater than or equal to a threshold, storing the one or more affine motion information parameters of the coding block in the HMVP buffer;
constructing a motion candidate list for a current block that includes at least one candidate selected from the affine motion information candidates stored in the HMVP buffer or derived from one of the affine motion information candidates stored in the HMVP buffer;
each entry in the HMVP buffer being ordered in accordance with a frequency of use of the one or more affine motion information parameters of each entry in the HMVP buffer, the frequency of use of the one or more affine motion parameters of each entry in the HMVP buffer being determined by:
determining a difference of one or more affine motion parameters of a newly added entry in the HMVP buffer with the one or more affine motion parameters of each other entry in the HMVP buffer, and
increasing a usage count of the newly added entry by 1 for each determined difference that is less than or equal to a frequency threshold; and
reordering the newly added entry in the HMVP buffer in accordance with the usage count of the newly added entry with respect to a usage count of each other entry in the HMVP buffer such that each entry in the HMVP buffer is ordered from a highest usage count to a lowest usage count.

* * * * *